US012356286B2

(12) United States Patent
Lee

(10) Patent No.: US 12,356,286 B2
(45) Date of Patent: Jul. 8, 2025

(54) METHODS, APPARATUS, AND ARTICLES OF MANUFACTURE TO LOCATE PERSONS BASED ON ADJUSTABLE SIGNAL STRENGTH THRESHOLDS

(71) Applicant: The Nielsen Company (US), LLC, New York, NY (US)

(72) Inventor: Morris Lee, Palm Harbor, FL (US)

(73) Assignee: The Nielsen Company (US), LLC, New York, NY (US)

(*) Notice: Subject to any disclaimer, the term of this patent is extended or adjusted under 35 U.S.C. 154(b) by 535 days.

(21) Appl. No.: 17/566,451

(22) Filed: Dec. 30, 2021

(65) Prior Publication Data

US 2023/0033659 A1  Feb. 2, 2023

Related U.S. Application Data

(60) Provisional application No. 63/224,783, filed on Jul. 22, 2021.

(51) Int. Cl.
*H04W 4/029* (2018.01)
*H04B 17/27* (2015.01)
*H04B 17/318* (2015.01)

(52) U.S. Cl.
CPC .......... *H04W 4/029* (2018.02); *H04B 17/27* (2015.01); *H04B 17/318* (2015.01)

(58) Field of Classification Search
None
See application file for complete search history.

(56) References Cited

U.S. PATENT DOCUMENTS

| 3,805,238 | A | 4/1974 | Rothfjell |
| 4,468,807 | A | 8/1984 | Moulton |
| 4,611,347 | A | 9/1986 | Netravali et al. |
| 4,626,904 | A | 12/1986 | Lurie |

(Continued)

FOREIGN PATENT DOCUMENTS

| EP | 0262757 A2 | 4/1988 |
| EP | 1133090 B1 | 2/2008 |

(Continued)

OTHER PUBLICATIONS

Wikipedia, "Beacon Frame," last edited Nov. 20, 2020, retrieved from https://en.wikipedia.org/w/index.php?title=Beacon_frame &oldid=989762788, 3 pages.

(Continued)

*Primary Examiner* — Adolf Dsouza

(57) ABSTRACT

In one example, a method is described. The method includes: collecting monitoring area information for a monitoring environment, determining, based on the monitoring area information, one or more signal strength thresholds to set for one or more radio frequency (RF) beacons deployed to the monitoring environment and, after reception of monitoring information from one or more devices in the monitoring environment, processing the monitoring information and the one or more signal strength thresholds to determine one or more locations of the one or more devices in the monitoring environment. The method can further include storing the one or more locations of the one or more devices in a location database.

20 Claims, 14 Drawing Sheets

(56) References Cited

U.S. PATENT DOCUMENTS

| | | |
|---|---|---|
| 4,644,509 A | 2/1987 | Kiewit et al. |
| 4,658,290 A | 4/1987 | McKenna et al. |
| 4,769,697 A | 9/1988 | Gilley et al. |
| 4,779,198 A | 10/1988 | Lurie |
| 4,843,631 A | 6/1989 | Steinpichler et al. |
| 4,849,737 A | 7/1989 | Kirihata et al. |
| 4,858,000 A | 8/1989 | Lu |
| 4,993,049 A | 2/1991 | Cupps |
| 5,031,228 A | 7/1991 | Lu |
| 5,063,603 A | 11/1991 | Burt |
| 5,067,160 A | 11/1991 | Omata et al. |
| 5,097,328 A | 3/1992 | Boyette |
| 5,099,324 A | 3/1992 | Abe |
| 5,121,201 A | 6/1992 | Seki |
| 5,144,797 A | 9/1992 | Swars |
| 5,164,992 A | 11/1992 | Turk et al. |
| 5,229,764 A | 7/1993 | Matchett et al. |
| 5,331,544 A | 7/1994 | Lu et al. |
| 5,373,315 A | 12/1994 | Dufresne et al. |
| 5,384,716 A | 1/1995 | Araki et al. |
| 5,412,738 A | 5/1995 | Brunelli et al. |
| 5,481,294 A | 1/1996 | Thomas et al. |
| 5,481,622 A | 1/1996 | Gerhardt et al. |
| 5,497,185 A | 3/1996 | Dufresne et al. |
| 5,550,928 A | 8/1996 | Lu et al. |
| 5,629,752 A | 5/1997 | Kinjo |
| 5,675,663 A | 10/1997 | Koerner et al. |
| 5,715,325 A | 2/1998 | Bang et al. |
| 5,719,951 A | 2/1998 | Shackleton et al. |
| 5,771,307 A | 6/1998 | Lu et al. |
| 5,781,650 A | 7/1998 | Lobo et al. |
| 5,793,409 A | 8/1998 | Tetsumura |
| 5,801,763 A | 9/1998 | Suzuki |
| 5,805,745 A | 9/1998 | Graf |
| 5,835,616 A | 11/1998 | Lobo et al. |
| 5,850,470 A | 12/1998 | Kung et al. |
| 5,859,921 A | 1/1999 | Suzuki |
| 5,864,630 A | 1/1999 | Cosatto et al. |
| 5,878,156 A | 3/1999 | Okumura |
| 5,892,837 A | 4/1999 | Luo et al. |
| 5,901,244 A | 5/1999 | Souma et al. |
| 5,920,641 A | 7/1999 | Ueberreiter et al. |
| 5,963,670 A | 10/1999 | Lipson et al. |
| 5,978,507 A | 11/1999 | Shackleton et al. |
| 5,987,154 A | 11/1999 | Gibbon et al. |
| 6,014,461 A | 1/2000 | Hennessey et al. |
| 6,032,106 A | 2/2000 | Ishii |
| 6,047,134 A | 4/2000 | Sekine et al. |
| 6,055,323 A | 4/2000 | Okumura |
| 6,144,797 A | 11/2000 | MacCormack et al. |
| 6,332,033 B1 | 12/2001 | Qian |
| 6,332,038 B1 | 12/2001 | Funayama et al. |
| 6,363,159 B1 | 3/2002 | Rhoads |
| 6,507,391 B2 | 1/2003 | Riley et al. |
| 6,625,316 B1 | 9/2003 | Maeda |
| 6,940,545 B1 | 9/2005 | Ray et al. |
| 6,944,319 B1 | 9/2005 | Huang et al. |
| 7,035,467 B2 | 4/2006 | Nicponski |
| 7,043,056 B2 | 5/2006 | Edwards et al. |
| 7,134,130 B1 | 11/2006 | Thomas |
| 7,155,159 B1 | 12/2006 | Weinblatt et al. |
| 7,158,177 B2 | 1/2007 | Kage et al. |
| 7,203,338 B2 | 4/2007 | Ramaswamy et al. |
| 7,433,696 B2 * | 10/2008 | Dietrich ............... G01S 5/0244 |
| | | 455/67.11 |
| 7,440,593 B1 | 10/2008 | Steinberg et al. |
| 7,466,844 B2 | 12/2008 | Ramaswamy et al. |
| 7,602,524 B2 | 10/2009 | Eichhorn et al. |
| 7,609,853 B2 | 10/2009 | Ramaswamy et al. |
| 7,636,456 B2 | 12/2009 | Collins et al. |
| 7,676,065 B2 | 3/2010 | Wiedemann et al. |
| 7,697,735 B2 | 4/2010 | Adam et al. |
| 7,796,154 B2 | 9/2010 | Senior et al. |
| 7,899,209 B2 | 3/2011 | Greiffenhagen et al. |
| 8,194,923 B2 | 6/2012 | Ramaswamy et al. |
| 8,508,357 B2 | 8/2013 | Srinivasan et al. |
| 8,620,088 B2 | 12/2013 | Lee |
| 8,660,308 B2 | 2/2014 | Ramaswamy et al. |
| 8,824,740 B2 | 9/2014 | Ramaswamy et al. |
| 8,938,211 B2 | 1/2015 | Das et al. |
| 9,020,780 B2 | 4/2015 | Zhang et al. |
| 9,082,004 B2 | 7/2015 | Nielsen |
| 9,426,525 B2 | 8/2016 | Soundararajan et al. |
| 9,560,267 B2 | 1/2017 | Nielsen |
| 9,609,385 B2 | 3/2017 | Hicks |
| 9,843,717 B2 | 12/2017 | Nielsen |
| 10,165,177 B2 | 12/2018 | Nielsen |
| 10,966,007 B1 | 3/2021 | Fenner et al. |
| 11,232,688 B1 | 1/2022 | Lemberger et al. |
| 11,245,839 B2 | 2/2022 | Nielsen |
| 11,470,243 B2 | 10/2022 | Nielsen |
| 2002/0198762 A1 | 12/2002 | Donato |
| 2003/0033600 A1 | 2/2003 | Cliff et al. |
| 2003/0081834 A1 | 5/2003 | Philomin et al. |
| 2003/0093784 A1 | 5/2003 | Dimitrova et al. |
| 2004/0122679 A1 | 6/2004 | Neuhauser et al. |
| 2004/0220753 A1 | 11/2004 | Tabe |
| 2005/0117783 A1 | 6/2005 | Sung et al. |
| 2005/0136845 A1 * | 6/2005 | Masuoka ............... G01S 1/042 |
| | | 455/67.14 |
| 2005/0144632 A1 | 6/2005 | Mears et al. |
| 2005/0198661 A1 | 9/2005 | Collins et al. |
| 2006/0062429 A1 | 3/2006 | Ramaswamy et al. |
| 2006/0133699 A1 | 6/2006 | Widrow et al. |
| 2006/0200841 A1 | 9/2006 | Ramaswamy et al. |
| 2007/0121959 A1 | 5/2007 | Philipp |
| 2007/0150916 A1 | 6/2007 | Begole et al. |
| 2007/0154063 A1 | 7/2007 | Breed |
| 2007/0263934 A1 | 11/2007 | Ojima et al. |
| 2007/0294126 A1 | 12/2007 | Maggio |
| 2008/0091510 A1 | 4/2008 | Crandall et al. |
| 2008/0232650 A1 | 9/2008 | Suzuki et al. |
| 2008/0243590 A1 | 10/2008 | Rich |
| 2008/0271065 A1 | 10/2008 | Buonasera et al. |
| 2009/0070797 A1 | 3/2009 | Ramaswamy et al. |
| 2009/0091650 A1 | 4/2009 | Kodama |
| 2009/0133058 A1 | 5/2009 | Kouritzin et al. |
| 2009/0177528 A1 | 7/2009 | Wu et al. |
| 2009/0265729 A1 * | 10/2009 | Weinblatt ............... H04H 60/45 |
| | | 725/19 |
| 2009/0290756 A1 | 11/2009 | Ramaswamy et al. |
| 2009/0307084 A1 | 12/2009 | Monighetti et al. |
| 2009/0310829 A1 | 12/2009 | Baba et al. |
| 2010/0066503 A1 * | 3/2010 | Rhie ..................... G01S 5/0226 |
| | | 340/10.1 |
| 2010/0109864 A1 * | 5/2010 | Haartsen ............... G01C 21/206 |
| | | 340/539.13 |
| 2010/0124274 A1 | 5/2010 | Cheok et al. |
| 2010/0245567 A1 | 9/2010 | Krahnstoever et al. |
| 2011/0019924 A1 | 1/2011 | Elgersma et al. |
| 2011/0023060 A1 | 1/2011 | Dmitriev et al. |
| 2011/0137721 A1 | 6/2011 | Bansal |
| 2011/0164188 A1 | 7/2011 | Karaoguz et al. |
| 2011/0169953 A1 | 7/2011 | Sandler et al. |
| 2011/0265110 A1 | 10/2011 | Weinblatt |
| 2011/0285845 A1 | 11/2011 | Bedros et al. |
| 2012/0081392 A1 | 4/2012 | Arthur |
| 2012/0088519 A1 * | 4/2012 | Agardh ................. H04W 4/33 |
| | | 455/456.1 |
| 2012/0151079 A1 | 6/2012 | Besehanic et al. |
| 2013/0013396 A1 | 1/2013 | Vinson et al. |
| 2013/0129159 A1 | 5/2013 | Huijgens et al. |
| 2013/0152113 A1 | 6/2013 | Conrad et al. |
| 2013/0156273 A1 | 6/2013 | Nielsen |
| 2013/0229518 A1 | 9/2013 | Reed et al. |
| 2014/0052405 A1 | 2/2014 | Wackym |
| 2014/0254880 A1 | 9/2014 | Srinivasan et al. |
| 2014/0366123 A1 | 12/2014 | DiBona et al. |
| 2015/0057964 A1 | 2/2015 | Albinali |
| 2015/0057967 A1 | 2/2015 | Albinali |
| 2015/0271390 A1 | 9/2015 | Nielsen |
| 2016/0037209 A1 | 2/2016 | Miyoshi |
| 2016/0065902 A1 | 3/2016 | Deng |
| 2016/0261911 A1 | 9/2016 | Soundararajan et al. |

(56) References Cited

U.S. PATENT DOCUMENTS

| | | | |
|---|---|---|---|
| 2017/0142330 A1 | 5/2017 | Nielsen | |
| 2018/0048807 A1 | 2/2018 | Nielsen | |
| 2018/0089898 A1 | 3/2018 | Huddy | |
| 2018/0285634 A1 | 10/2018 | Varadarajan et al. | |
| 2019/0089894 A1 | 3/2019 | Nielsen | |
| 2019/0287052 A1 | 9/2019 | Sundar et al. | |
| 2019/0287380 A1 | 9/2019 | Verbeke et al. | |
| 2019/0295393 A1 | 9/2019 | Lee et al. | |
| 2019/0325228 A1 | 10/2019 | Chaudhry et al. | |
| 2020/0228924 A1* | 7/2020 | Lelkens | G01S 5/021 |
| 2020/0265835 A1 | 8/2020 | Ni | |
| 2020/0275835 A1 | 9/2020 | Chintala et al. | |
| 2020/0296463 A1 | 9/2020 | Martinez et al. | |
| 2020/0351436 A1 | 11/2020 | Nielsen | |
| 2020/0364885 A1 | 11/2020 | Latapie et al. | |
| 2020/0374491 A1 | 11/2020 | DeAngelus et al. | |
| 2021/0000403 A1 | 1/2021 | Xu et al. | |
| 2021/0133483 A1 | 5/2021 | Prabhu et al. | |
| 2021/0281943 A1 | 9/2021 | Lehnert | |
| 2021/0319782 A1 | 10/2021 | Gong et al. | |
| 2021/0327243 A1 | 10/2021 | Franco et al. | |
| 2021/0400427 A1 | 12/2021 | Burowski et al. | |
| 2021/0409844 A1 | 12/2021 | Livoti et al. | |
| 2022/0052867 A1 | 2/2022 | Nakano et al. | |
| 2022/0171466 A1 | 6/2022 | Zhang et al. | |
| 2023/0047888 A1 | 2/2023 | Christian et al. | |

FOREIGN PATENT DOCUMENTS

| | | |
|---|---|---|
| WO | 9605571 A1 | 2/1996 |
| WO | 9927668 A1 | 6/1999 |
| WO | 2004053791 A2 | 6/2004 |
| WO | 2004054255 A1 | 6/2004 |

OTHER PUBLICATIONS

Wikipedia, "Bluetooth low energy beacon," last edited Jan. 4, 2021, retrieved from https://en.wikipedia.org/w/index.php?title=Bluetooth_low_energy_beacon&oldid=998169451, 8 pages.

Google Play, "Bluetooth signal strength meter," accessed Feb. 12, 2021, produced by Edgar Garcia Leyva, retrieved from https://play.google.com/store/apps/details?id=dev.egl.com.intensidadbluetooth&hl=en_US&gl=US, 5 pages.

Google Play, "FIND3—WiFi+Bluetooth based local GPS," accessed May 15, 2021, produced by Hypercube Platforms, retrieved from https://play.google.com/store/apps/details?id=com.internalpositioning.find3.find3app&hl=en_US&gl=US, 4 pages.

Adam Hernod Olevall et al., "Indoor Navigation and Personal Tracking System Using Bluetooth Low Energy Beacons," dated Oct. 2017, in conjuncture with Uppsala Universitet, 79 pages.

Blackstone, "Understanding the different types of BLE Beacons," last updated Mar. 24, 2015, retrieved from https://os.mbed.com/blog/entry/BLE-Beacons-URIBeacon-AltBeacons-iBeacon/, 7 pages.

Google Play, "WiFi signal strength meter," accessed Feb. 12, 2021, produced by Edgar Garcia Leyva, retrieved from https://play.google.com/store/apps/details?id=dev.egl.com.intensidadwifi&hl=en_US&gl=US, 5 pages.

"Proximity Detection to Reveal a Consumer's Shopping Pattern/Path and Purchases made in store," dated Jan. 30, 2012, 4 pages.

Duda et al., "Pattern Classification and Scene Analysis", Chapter 2, Bayes Decision Theory, Stanford Research Institute, Menlo Park, CA, 1973, 19 pages.

Duncan Graham-Rowe, "Hot Shopping", New Scientist Magazine, Issue 2230, Mar. 18, 2000, p. 12, retrieved from http://www.newscientist.com/article.nsid=mg16522301.7008Lprint=true.

Gudino, Miguel, How do Motion Sensors Work? Types of Motion Sensors, Arrow Electronics, published Jun. 23, 2020, retrieved from https://www.arrow.com/en/research-and-events/articles/how-motion-sensors-work on Mar. 15, 2023, 5 pages.

"Infrared Person Tracking", IBM ECVG, retrieved May 6, 2009 from http://www.research.ibm.com/ecvg/misc/footprint.html, last updated Jun. 12, 2002, 2 pages.

United States Patent and Trademark Office, "Non-Final Office Action" issued in connection with U.S. Appl. No. 17/175,354, dated Jan. 20, 2023, 5 pages.

Qing et al., "Histogram Based Fuzzy C-Mean Algorithm for Image Segmentation", Zhejiang University, IEEE, 1992, 4 pages.

Teixeira et al., "A Survey of Human-Sensing: Methods for Detecting Presence", Count, Location, Track, and Identity, ENALAB Technical Report Sep. 2010, vol. 1, No. 1, Sep. 2010, 41 pages.

United States Patent and Trademark Office, "Non-Final Office Action," issued in connection with U.S. Appl. No. 18/327,208, dated Dec. 13, 2023, 6 pages.

United States Patent and Trademark Office, "Final Office Action", issued in connection with U.S. Appl. No. 17/403,461, dated Jan. 31, 2023, 12 pages.

United States Patent and Trademark Office, "Non-Final Office Action", issued in connection with U.S. Appl. No. 17/403,461, dated Jul. 22, 2022, 10 pages.

United States Patent and Trademark Office, "Non-Final Office Action", issued in connection with U.S. Appl. No. 17/561,473, dated Jul. 21, 2022, 17 pages.

Wikipedia. (Dec. 2010) Kinect, http://en.wikipedia.org/wiki/Kinect, 15 pages.

* cited by examiner ns and/or example operations of FIG. 7 to implement the
METHODS, APPARATUS, AND ARTICLES OF MANUFACTURE TO LOCATE PERSONS BASED ON ADJUSTABLE SIGNAL STRENGTH THRESHOLDS

RELATED APPLICATION

This patent claims the benefit of U.S. Provisional Patent Application No. 63/224,783, which was filed on Jul. 22, 2021. U.S. Provisional Patent Application No. 63/224,783 is hereby incorporated herein by reference in its entirety. Priority to U.S. Provisional Patent Application No. 63/224,783 is hereby claimed.

FIELD OF THE DISCLOSURE

This disclosure relates generally to audience monitoring and, more particularly, to methods, apparatus, and articles of manufacture to locate persons based on adjustable signal strength thresholds.

BACKGROUND

Media providers and/or other entities such as advertising companies, broadcast networks, etc., are often interested in the viewing, listening, and/or media behavior of audience members and/or the public in general. Audience measurement entities (AMEs) collect audience measurement information from panelists (e.g., individuals who agree to be monitored by an AME) including the number of unique audience members for particular media. The media usage and/or exposure habits of monitored audience members, as well as demographic data about the audience members, are collected and used to statistically determine the size and/or demographics of an audience of interest. To determine the media usage and/or exposure habits of monitored audience members, interested entities may need to determine the number of persons present at a media device during a media presentation on that media device.

Figure 1:
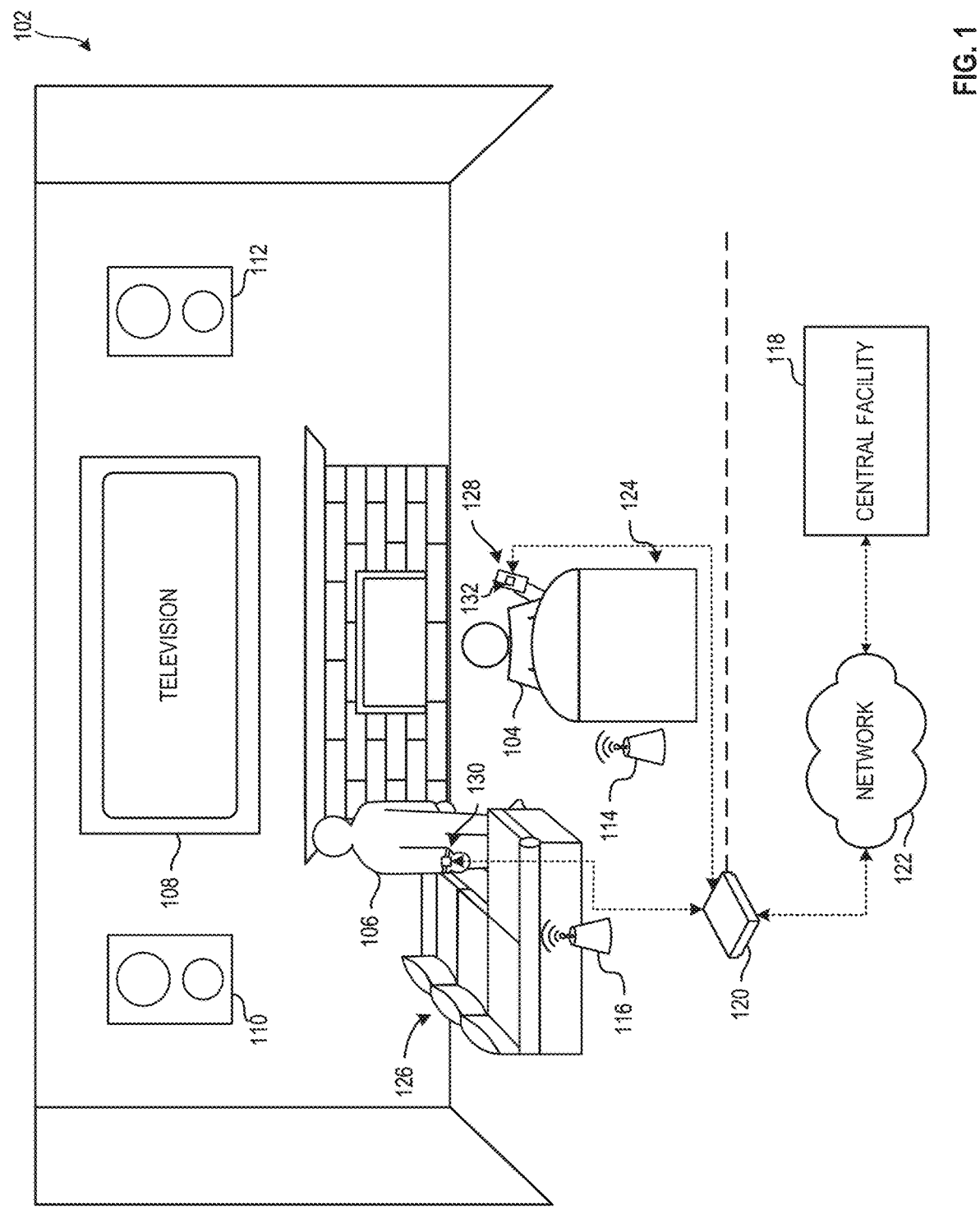
FIG. 1 is an illustration of an example media presentation environment including an example person location system constructed in accordance with the teachings of this disclosure to locate one or more persons based on adjustable signal strength thresholds.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially similar" refers to differences in a nearly exact items recognizing that there may be real world differences due to computing error, manufacturing error, etc. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s). In some examples, the acronym "ASIC" stands for application specific integrated circuitry.

DETAILED DESCRIPTION

AMEs usually collect large amounts of audience measurement information, including the unique audience size for particular media, from their panelists. Unique audience size, as used herein, refers to the total number of unique people (e.g., non-duplicate people) who had an impression of (e.g., were exposed to) a particular media item, without counting duplicate audience members. Additionally, AMEs are interested in identifying the location of audience members in a media presentation environment and/or other persons in other monitoring environments (e.g., consumers in a retail store). As used herein, a monitoring environment includes an environment in which a person is exposed to and/or accesses one or more products and/or one or more services provided by another entity (e.g., a multimedia provider, a retail store, etc.) and/or any other environment in which a person may be located. As such, monitoring environments are not limited to media presentation environments or retail stores but include other environments such a person's home, as public transit vehicles and/or stations utilized by one or more persons, an airplane utilized by one or more passengers, a public roadway utilized by one or more commuters, or any other environment in which a person may be monitored.

Many technologies (including those that rely on ultrasonic audio signals, Wi-Fi® signal strength patterns, ultrawideband radio signals, and radio-frequency identification tags) exist to determine the location of audience members in a media presentation environment and/or other persons in other monitoring environments. However, existing technologies can be improved. For example, existing technologies provide inaccurate locations for audience members frequently enough to prohibit the widespread implementation of existing technologies. Additionally, existing technologies can require large capital expenditure to implement and/or are too burdensome for panelists to set up and use daily.

Unlike existing technologies, examples disclosed herein provide adjustable signal strength thresholds to detect one or more persons in a monitoring environment. For example, disclosed methods, apparatus, and articles of manufacture include one or more radio frequency (RF) transmitters and/or one or more RF transceivers (referred to generally as one or more RF beacons) implemented at a monitoring environment (e.g., a media presentation environment, a retail store, etc.) to determine a number of one or more wireless capable devices at the monitoring environment. Additionally, examples disclosed herein determine the location of one or more wireless capable devices within a monitoring environment. Example threshold signal strengths for detection (e.g., signal strength thresholds) of RF beacons, as disclosed herein, are adjustable based on monitoring area information.

As used herein, monitoring area information includes the size (e.g., width, length, diameter, and/or other dimension) of a monitoring area within a monitoring environment, the number of RF beacons deployed to a monitoring environment, the number of RF beacons assigned to a monitoring area of a monitoring environment. As used herein, a monitoring area refers to an area within a monitoring environment within which one or more persons are exposed to and/or access one or more products and/or one or more services provided by another entity. As used herein, signal strength threshold refers to a signal strength below which a device shall not register detection of an RF beacon regardless of whether a beacon detection signal (discussed further herein) for the RF beacon was received by a device. By adjusting the signal strength thresholds corresponding to the one or more RF beacons, example methods, apparatus, and articles of manufacture disclosed herein improve the ability to detect devices (e.g., a proxy for people) in a monitoring environment. For example, if a monitoring area is irregularly shaped, examples disclosed herein allow one or more RF beacons to be deployed and assigned to the monitoring area with varied signal strength thresholds that are tailored to the irregularly shaped monitoring area.

FIG. 1 is an illustration of an example media presentation environment 102 including an example person location system constructed in accordance with the teachings of this disclosure to locate one or more persons based on adjustable signal strength thresholds. In the illustrated example of FIG. 1, the example media presentation environment 102 includes example panelists 104, 106, an example media presentation device 108 that receives media from an example media source (not shown), an example first speaker 110, an example second speaker 112, an example first RF beacon 114, and an example second RF beacon 116. In the example of FIG. 1, the first RF beacon 114 and/or the second RF beacon 116 generate one or more signals that allow for the location of one or more devices in the media presentation environment 102. An example central facility 118 sets and/or adjusts the signal strength thresholds corresponding to the first RF beacon 114 and/or the second RF beacon 116 to adjust the areas within which the first RF beacon 114 and/or the second RF beacon 116 are detectable (e.g., a detection area). In the example of FIG. 1, the first RF beacon 114 and the second RF beacon 116 are implemented by the same or substantially similar RF beacon model.

In the illustrated example of FIG. 1, based on the presumption that people frequently carry smartphones, smart watches, and/or other devices that are capable of wireless communication, the number of unique devices detected based on the signal(s) generated by the first RF beacon 114 and/or the second RF beacon 116 can be translated (e.g., by the one or more devices, the central facility 118, and/or another device) to a unique audience size for the media presentation environment 102. The one or more devices that detect the first RF beacon 114 and/or the second RF beacon 116 report device monitoring information (discussed further herein) to the central facility 118 via an example gateway 120 and an example network 122. For purposes of clarity, the second RF beacon 116 will not be discussed further herein. In some examples, such as when the description of the second RF beacon 116 differs from the description of the first RF beacon 114, the second RF beacon 116 is discussed further herein. However, any of the description and/or illustration of solely the first RF beacon 114 should be understood to similarly apply to the second RF beacon 116.

In the illustrated example of FIG. 1, the example media presentation environment 102 is a room of a household (e.g., a room in a home of a panelist, such as the home of a "Nielsen family"). In the illustrated example of FIG. 1, the example panelists 104, 106 of the household have been statistically selected to develop media ratings data (e.g., television ratings data) for a population/demographic of interest. People become panelists via, for example, a user interface presented on a media device (e.g., via the media presentation device 108, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 104, 106 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 102 is a household in the illustrated example of FIG. 1, the example media presentation environment 102 can additionally or alternatively be any other type(s) of environments such as, for example, a theater, a restaurant, a tavern, a retail location, an arena, etc.

In the illustrated example of FIG. 1, the example media presentation device 108 is a television. However, the example media presentation device 108 can correspond to any type of audio, video and/or multimedia presentation device capable of presenting media audibly and/or visually. In the illustrated example of FIG. 1, the media presentation device 108 is in communication with the first speaker 110 and the second speaker 112. In some examples, the media presentation device 108 (e.g., a television) may communicate audio to another media presentation device (e.g., an audio/video receiver) for output by the first speaker 110 and/or the second speaker 112 (e.g., surround sound speakers, a sound bar, etc.). As another example, the media presentation device 108 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 104, 106).

The media presentation device 108 receives media from a media source (not illustrated). The media source may be any type of media provider(s), such as, but not limited to, a cable media service provider, an RF media provider, an Internet based provider (e.g., IPTV), a satellite media service provider, etc., and/or any combination thereof. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. For example, the media presentation device 108 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source, etc., is also typically included in the media.

In the illustrated example of FIG. 1, the media presentation environment 102 includes an example first monitoring area 124 and an example second monitoring area 126. In the example of FIG. 1, the first monitoring area 124 and the second monitoring area 126 include areas within the media presentation environment 102 in which the panelists 104, 106 are exposed to and/or view media presented by the media presentation device 108. For example, the first monitoring area 124 corresponds to the area covered by an armchair. In the example of FIG. 1, the second monitoring area 126 corresponds to the area covered by a sectional couch.

In examples disclosed herein, an AME provides the first RF beacon 114 and the second RF beacon 116 to the panelists 104, 106 (or household of panelists) such that the first RF beacon 114 and/or the second RF beacon 116 may be installed in the media presentation environment 102. In some examples, the first RF beacon 114 and/or the second RF beacon 116 is installed by the panelists 104, 106 by powering the first RF beacon 114 and/or the second RF beacon 116 and placing the first RF beacon 114 and/or the second RF beacon 116 near the first monitoring area 124 and/or the second monitoring area 126, respectively, and/or in the media presentation environment 102. Preferably, the first RF beacon 114 is placed beside and/or at the center of the first monitoring area 124 and the second RF beacon 116 is placed beside and/or at the center of the second monitoring area 126. However, if not possible, the first RF beacon 114 may be placed equidistant (and/or any other distance) from the second RF beacon 116 within the media presentation environment 102. In this manner, example RF beacons disclosed herein advantageously reduce the burden for panelists to set up and use example person location systems daily. As such, examples disclosed herein will increase the accuracy and reliability of data gathered by example person location systems.

Additionally or alternatively, one or more of the panelists 104, 106 collects monitoring area information associated with the first monitoring area 124, the second monitoring area 126, and/or, more generally, the media presentation environment 102, for use by the central facility 118 in determining audience size in the media presentation environment 102. For example, one or more of the panelists 104, 106 collects information identifying the size (e.g., width, length, and/or other dimension) of the first monitoring area 124, the size (e.g., width, length, and/or other dimension) of the second monitoring area 126, the number of RF beacons (e.g., two in the example of FIG. 1) deployed to the media presentation environment 102, which RF beacon is assigned to monitor the first monitoring area 124, and which RF beacon is assigned to monitor the second monitoring area 126.

In the illustrated example of FIG. 1, the monitoring area information indicates that the first RF beacon 114 is assigned to monitor the first monitoring area 124. Additionally, the monitoring area information indicates that the second RF beacon 116 is assigned to monitor the second monitoring area 126. As such, based on the monitoring area information, the central facility 118 sets and/or adjusts the one or more signal strength thresholds corresponding to the first RF beacon 114 to adjust the detection area of the first RF beacon 114 to match the area of the first monitoring area 124. Similarly, based on the monitoring area information, the central facility 118 sets and/or adjusts the one or more signal strength thresholds corresponding to the second RF beacon 116 to adjust the detection area of the second RF beacon 116 to match the area of the second monitoring area 126.

In the example of FIG. 1, one or more of the panelists 104, 106 enters the monitoring area information via an application on a smart phone or other device. Additionally or alternatively, one or more of the panelists 104, 106 writes the monitoring area information on a form and/or other information receptacle (e.g., one or more pieces of paper, a pad of paper, etc.), and mails the form and/or other information receptacle to the AME. In some examples, a technician and/or other employee of an AME sets up and/or otherwise installs the first RF beacon 114 and/or the second RF beacon 116. In such examples, the technician and/or other employee of the AME collects the monitoring area information and provides the monitoring area information to the AME for use by the central facility 118 in determining audience size and/or location in the media presentation environment 102.

In the illustrated example of FIG. 1, the first RF beacon 114 is implemented by one or more transmitters and one or more general purpose semiconductor-based electrical circuits programmed with instructions to perform specific operations and including one or more semiconductor-based logic devices (e.g., electrical hardware implemented by one or more transistors). In some examples, the one or more transmitters are implemented by one or more transceivers. In some examples, the first RF beacon 114 is implemented by processor circuitry, analog circuit(s), digital circuit(s), logic circuit(s), programmable processor(s), programmable microcontroller(s), GPU(s), DSP(s), ASIC(s), PLD(s) and/or FPLD(s) such as FPGAs.

In the illustrated example of FIG. 1, the first RF beacon 114 transmits a beacon detection signal into the media presentation environment 102. In examples disclosed herein, a beacon detection signal includes an identifier of the RF beacon that transmitted the beacon detection signal and location determination information. As such, multiple beacon detection signals include respective identifiers of the one or more RF beacons that transmitted the multiple beacon detection signals and respective location determination information. Example location determination information includes the known signal strength a set distance from the RF beacon that transmitted the beacon detection signal. As such, for multiple beacon detection signals, the respective location determination information includes respective known signal strengths a set distance from the one or more RF beacons that transmitted the one or more beacon detection signals.

In the illustrated example of FIG. 1, the first RF beacon 114 transmits a beacon detection signal into the media presentation environment 102 as a Bluetooth signal. Because Bluetooth signal strength decreases rapidly (as compared to other RF signals) with distance from the source, example RF beacons disclosed herein advantageously allow one or more devices (e.g., one or more devices in the media presentation environment 102, the central facility 118, etc.) to determine the distance of the one or more devices from the RF beacons based on at least the strength of the Bluetooth signal received by the one or more devices. However, in other examples, the first RF beacon 114 may transmit the beacon detection signal into the media presentation environment 102 as any other RF signal. Additionally, because examples disclosed herein implement RF beacons, examples disclosed herein reduce capital expenditure required to implement example person location systems. For example, RF beacons cost much less money than other technologies.

In the illustrated example of FIG. 1, the panelist 104 is holding and/or otherwise operating an example first wireless device 128 within the first monitoring area 124. In the example of FIG. 1, the first wireless device 128 is implemented by a smartphone including at least network interface control circuitry and one or more general purpose semiconductor-based electrical circuits programmed with instructions to perform specific operations and including one or more semiconductor-based logic devices (e.g., electrical hardware implemented by one or more transistors). In some examples, the first wireless device 128 is implemented by processor circuitry, analog circuit(s), digital circuit(s), logic circuit(s), programmable processor(s), programmable microcontroller(s), GPU(s), DSP(s), ASIC(s), PLD(s) and/or FPLD(s) such as FPGAs. For example, the first wireless device 128 is implemented by a smart phone. In the example of FIG. 1, the panelist 106 is wearing and/or otherwise operating an example second wireless device 130 including at least network interface control circuitry and one or more general purpose semiconductor-based electrical circuits programmed with instructions to perform specific operations and including one or more semiconductor-based logic devices (e.g., electrical hardware implemented by one or more transistors). In some examples, the second wireless device 130 is implemented by processor circuitry, analog circuit(s), digital circuit(s), logic circuit(s), programmable processor(s), programmable microcontroller(s), GPU(s), DSP(s), ASIC(s), PLD(s) and/or FPLD(s) such as FPGAs. For example, the second wireless device 130 is implemented by a smart watch. In the example of FIG. 1, the first wireless device 128 (e.g., the network interface control circuitry and the one or more general purpose semiconductor-based electrical circuits programmed with instructions to perform specific operations and including one or more semiconductor-based logic devices) includes example locator circuitry 132. Additionally, the second wireless device 130 (e.g., the network interface control circuitry and the one or more general purpose semiconductor-based electrical circuits programmed with instructions to perform specific operations and including one or more semiconductor-based logic devices) includes locator circuitry.

In the illustrated example of FIG. 1, the locator circuitry of the second wireless device 130 is not illustrated for the sake of clarity in the figures. As such, the locator circuitry of the second wireless device 130 will not be discussed further herein. In some examples, such as when the description of the locator circuitry of the second wireless device 130 differs from the description of the locator circuitry 132, the locator circuitry of the second wireless device 130 is discussed further herein. However, any of the description and/or illustration of solely the locator circuitry 132 should be understood to similarly apply to the locator circuitry of the second wireless device 130.

In the illustrated example of FIG. 1, the locator circuitry 132 monitors the central facility 118 for a communication including one or more signal strength thresholds for the first RF beacon 114 and/or the second RF beacon 116. If the locator circuitry 132 receives one or more signal strength thresholds, the locator circuitry 132 determines whether the one or more signal strength thresholds are updated relative to the one or more signal strength thresholds currently maintained by the locator circuitry 132. In response to determining that one or more updated signal strength thresholds have been received, the locator circuitry 132 adjusts the one or more signal strength thresholds maintained by the locator circuitry 132 to reflect the update(s).

In the illustrated example of FIG. 1, in response to the locator circuitry 132 determining that the one or more signal strength thresholds are not updated relative to the one or more signal strength thresholds currently maintained by the locator circuitry 132, the locator circuitry 132 determines whether one or more beacon detection signals have been received from the first RF beacon 114 and/or the second RF beacon 116. In response to the locator circuitry 132 determining that one or more beacon detection signals have been received, the locator circuitry 132 determines one or more signal strengths of the one or more beacon detection signals. Additionally, the locator circuitry 132 determines whether to determine the location of the first wireless device 128 locally or to offload such location determination to the central facility 118. In some examples, the locator circuitry 132 determines to offload location determination to the central facility 118 based on the power level of the first wireless device 128.

In the illustrated example of FIG. 1, if the locator circuitry 132 determines to perform location determination locally, the locator circuitry 132 processes the signal strength(s) of one or more beacon detection signals received by the first wireless device 128, the associated location determination information, and the corresponding signal strength thresholds to determine the location of the first wireless device 128 with respect to one or more RF beacons. For example, the locator circuitry 132 implements a machine learning algorithm (discussed further herein) to determine the location of the first wireless device 128 with respect to one or more RF beacons. In some examples, the locator circuitry 132 processes a signal strength of a beacon detection signal, the associated location determination information, and the corresponding signal strength thresholds according to the iBeacon® standard. However, in additional or alternative examples, the locator circuitry 132 may perform location determination based on another standard such as AltBeacon®, URIBeacon, among others.

Alternatively, if the locator circuitry 132 determines to offload location determination to the central facility 118, the locator circuitry 132 transmits respective identifiers of one or more RF beacons that transmitted one or more beacon detection signals received by the first wireless device 128, respective location determination information, and respective signal strengths of the one or more beacon detection signals received by the by the first wireless device 128 to the central facility 118 via the gateway 120 and the network 122. In some examples, the locator circuitry 132 is not configured to determine device location locally. In such examples, after determining one or more signal strengths of the one or more beacons detection signals, the locator circuitry 132 transmits the one or more signal strengths and location determination information to the central facility 118. Additionally, in some examples, the locator circuitry 132 may communicate with a central hub (e.g., another meter in the media presentation environment 102) that collects communications from devices (e.g., the first wireless device 128 and/or the second wireless device 130) in the media presentation environment 102 and sends one or more communications to the central facility 118. Additionally or alternatively, in such examples, the central hub may transmit one or more signal strength thresholds to the first wireless device 128 and/or the second wireless device 130.

In some examples, the first wireless device 128 includes means for locating one or more devices. For example, the means for locating one or more devices may be implemented by the locator circuitry 132. In some examples, the locator circuitry 132 may be implemented by machine executable instructions and/or operations such as that implemented by at least blocks 802, 804, 806, 808, 810, 812, 814, 816, 818, and 820 of FIG. 8 executed and/or instantiated by processor circuitry, which may be implemented by the example processor circuitry 1212 of FIG. 12, the example, microprocessor 1300 of FIG. 13, and/or the example FPGA circuitry 1400 of FIG. 14. In other examples, the locator circuitry 132 is implemented by other hardware logic circuitry, hardware implemented state machines, and/or any other combination of hardware, software, and/or firmware. For example, the locator circuitry 132 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware, but other structures are likewise appropriate.

In the illustrated example of FIG. 1, the example gateway 120 is implemented by a router that enables the first wireless device 128, the second wireless device 130, and/or other devices in the media presentation environment 102 (e.g., the media presentation device 108) to communicate with the network 122 (e.g., the Internet.). In some examples, the first RF beacon 114 and the second RF beacon 116 communicate with the network 122. In some examples, the example gateway 120 includes gateway functionality such as modem capabilities. In some other examples, the example gateway 120 is implemented in two or more devices (e.g., a router, a modem, a switch, a firewall, etc.). The gateway 120 of the illustrated example may communicate with the network 122 via Ethernet, a digital subscriber line (DSL), a telephone line, a coaxial cable, a USB connection, a Bluetooth connection, any wireless connection, etc.

In some examples, the example gateway 120 hosts a Local Area Network (LAN) for the media presentation environment 102. In the illustrated example, the LAN is a wireless local area network (WLAN), and allows the first RF beacon 114, the second RF beacon 116, the first wireless device 128, the second wireless device 130, etc., to transmit and/or receive data via the Internet. Alternatively, the gateway 120 may be coupled to such a LAN. In examples disclosed herein, the example gateway 120 and/or connectivity to the Internet via the gateway 120 is provided by the panelists 104, 106. That is, the example gateway 120 is a device that is owned and/or operated by the panelists 104, 106, and is not provided by the AME. In some examples, the example gateway 120 may be provided by an Internet Service Provider (ISP) to facilitate communication between the LAN provided by the gateway 120 and the network 122 (e.g., the Internet). In examples disclosed herein, the first wireless device 128 and the second wireless device 130 utilize the LAN hosted by the example gateway 120 to transmit information to and/or receive information from the central facility 118. In some examples, the first RF beacon 114 and the second RF beacon 116 also utilize the LAN hosted by the example gateway 120 to transmit information to and/or receive information from the central facility 118.

In the illustrated example of FIG. 1, the network 122 is implemented by a wide area network (WAN) such as the Internet. However, in some examples, local networks may additionally or alternatively be used. Moreover, the example network 122 may be implemented using any type of public or private network such as, but not limited to, the Internet, a telephone network, a local area network (LAN), a cable network, and/or a wireless network, or any combination thereof.

In the illustrated example of FIG. 1, the central facility 118 is implemented by one or more general purpose semiconductor-based electrical circuits programmed with instructions to perform specific operations and including one or more semiconductor-based logic devices (e.g., electrical hardware implemented by one or more transistors). In some examples, the central facility 118 is implemented by processor circuitry, analog circuit(s), digital circuit(s), logic circuit(s), programmable processor(s), programmable microcontroller(s), GPU(s), DSP(s), ASIC(s), PLD(s) and/or FPLD(s) such as FPGAs. In the example of FIG. 1, the central facility 118 processes data received from one or more panelists (e.g., via the first wireless device 128, the second wireless device 130, and/or other mediums) to determine monitoring area information for a monitoring environment (e.g., the media presentation environment 102). Based on the monitoring area information, the central facility 118 sets one or more signal strength thresholds corresponding to one or more RF beacons deployed to the monitoring environment.

For example, the central facility 118 sets respective ones of the one or more signal strength thresholds corresponding to one or more RF beacons based on the number of RF beacons deployed to the monitoring environment, the number of RF beacons assigned to a monitoring area, and the size of the respective monitoring areas that the RF beacons are assigned to monitor. For example, for a larger monitoring area, the central facility 118 may set a lower signal strength threshold corresponding to the RF beacon assigned to that monitoring area. Conversely, for a smaller monitoring area, the central facility 118 may set a higher signal strength threshold corresponding to the RF beacon assigned to that monitoring area. Additionally, the central facility 118 may set higher signal strength thresholds when five RF beacons are deployed to a monitoring environment and lower signal strength thresholds three RF beacons are deployed to a monitoring environment. Also, if multiple RF beacons are assigned to monitor the same monitoring area, the central facility 118 may set a higher signal strength threshold corresponding to each RF beacon as compared to a scenario in which a single RF beacon was assigned to monitor the monitoring area.

In the illustrated example of FIG. 1, after determining the one or more signal strength thresholds to set corresponding to one or more RF beacons deployed to a monitoring environment, the central facility 118 adjusts the signal strength thresholds of the one or more RF beacons and transmits the one or more signal strength thresholds to one or more devices that are to be monitored by the central facility 118. For example, the central facility 118 updates a signal strength threshold table maintained by the central facility 118 and transmits the signal strength threshold table to the one or more devices that are to be monitored. In some examples, the signal strength threshold table includes the signal strength thresholds corresponding to respective RF beacons assigned to a monitoring environment (e.g., the media presentation environment 102). As described above, in some examples, the locator circuitry 132 is not configured to determine device location locally. In such examples, the central facility 118 does not transmit the one or more signal strength thresholds to the one or more devices that are to be monitored.

In the illustrated example of FIG. 1, the central facility 118 also monitors the one or more devices that are to be monitored (e.g., devices including locator circuitry such as the locator circuitry 132) within the monitoring environment. In response to receiving monitoring information from the one or more devices within the monitoring environment, the central facility 118 determines whether the monitoring information includes a location of a monitored device. As described above, in some examples, the central facility 118 may communicate with a central hub (e.g., another meter in the media presentation environment 102) to send communications to and/or receive communications from devices (e.g., the first wireless device 128 and/or the second wireless device 130) in the media presentation environment 102.

In the illustrated example of FIG. 1, monitoring information includes respective identifiers of one or more RF beacons that transmitted one or more beacon detection signals received by one or more monitored devices, respective location determination information, and respective signal strengths of the one or more beacon detection signals received by the one or more monitored device. Example monitoring information may be organized by monitored device (e.g., first monitoring information associated with a first monitored device, second monitoring information associated with a second monitored device, etc.) and/or in any other manner. In some examples (e.g., when a monitored device determines to perform location determination locally), monitoring information also includes the location of the monitored device with respect to the RF beacon that generated the beacon detection signal. If the monitoring information includes the location of a monitored device with respect to the RF beacon that generated the beacon detection signal, the central facility 118 stores the location of the monitored device.

Alternatively, if the monitoring information does not include a location of a monitored device with respect to the RF beacon that generated the beacon detection signal, the central facility 118 processes the monitoring information and the one or more signal strength thresholds corresponding to the RF beacon(s) identified in the monitoring information to determine the location of the monitored device. For example, the central facility 118 executes and/or instantiates an artificial intelligence (AI) and/or machine learning (ML) algorithm. For example, when instantiating an AI and/or ML model, the central facility 118 performs operations corresponding to instructions.

AI, including ML, deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a Naive Bayes model is used. Using a Naive Bayes model enables a device executing the model to determine, with a confidence level, whether a device is within or outside of the detection area of an RF beacon. In general, machine learning models/architectures that are suitable to use in example approaches disclosed herein will be those that provide a confidence level with a prediction and/or inference of the location of a device. However, other types of machine learning models could additionally or alternatively be used such as a nearest neighbor model, a support vector machine (SVM) model (e.g., a linear SVM, a radial basis function SVM, etc.), a Gaussian process model, a decision tree model, a random forest model, a neural network, an adaptive boosting (AdaBoost) model, a quadratic discriminant analysis model, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction and/or operation to be executed and/or instantiated by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

In some examples, the example person location system of FIG. 1 includes means for managing one or more monitoring environments. For example, the means for managing one or more monitoring environments may be implemented by the central facility 118. In some examples, the central facility 118 may be implemented by machine executable instructions and/or operations such as that implemented by at least blocks 702, 704, 706, 708, 710, 712, 714, 716, 718, and 720 of FIG. 7 executed and/or instantiated by processor circuitry, which may be implemented by the example processor circuitry 912 of FIG. 9, the example microprocessor 1000 of FIG. 10, and/or the example FPGA circuitry 1100 of FIG. 11. In other examples, the central facility 118 is implemented by other hardware logic circuitry, hardware implemented state machines, and/or any other combination of hardware, software, and/or firmware. For example, the central facility 118 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

Figure 2:
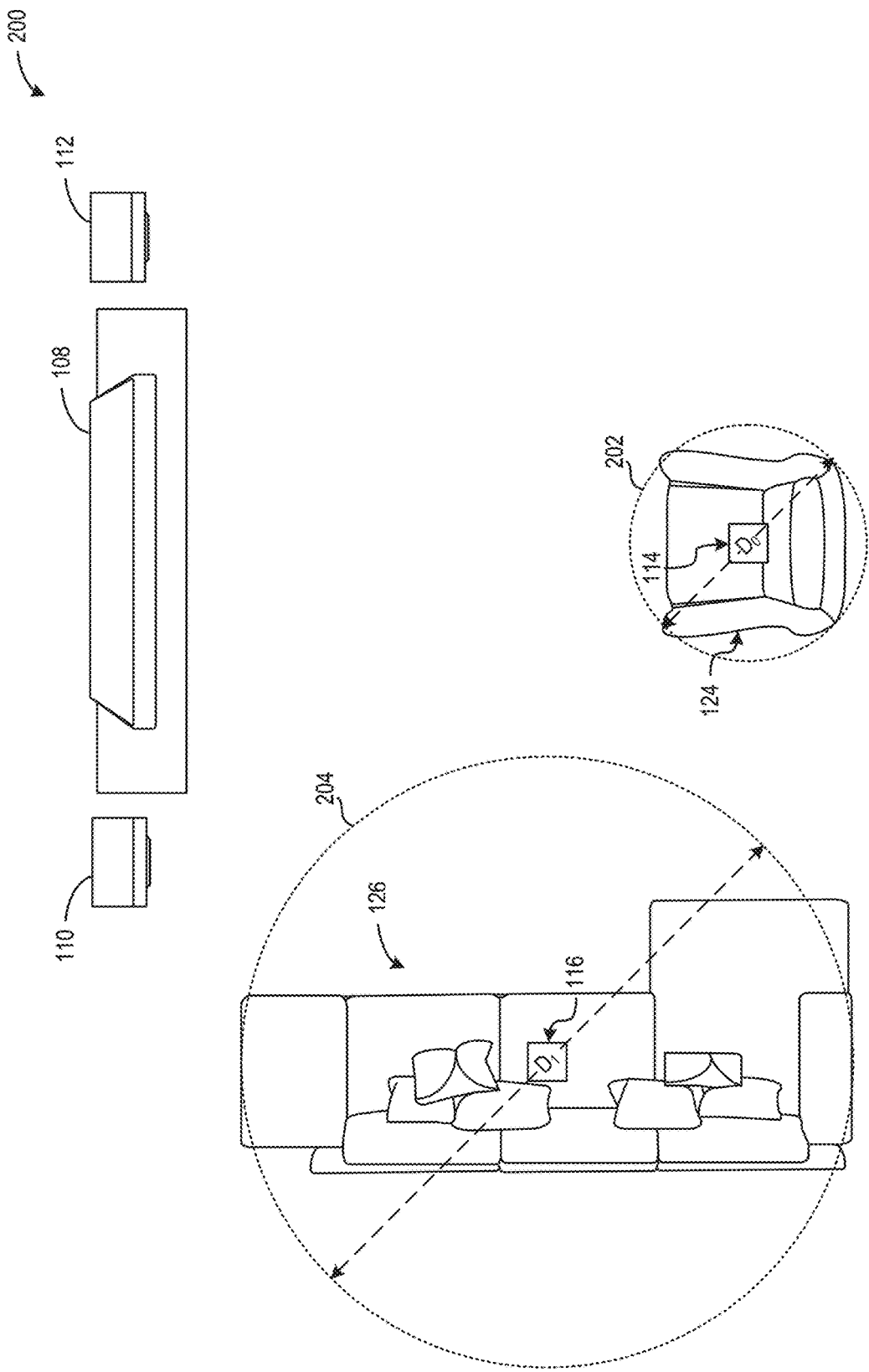
FIG. 2 illustrates an example first implementation of the example person location system of FIG. 1.

FIG. 2 illustrates an example first implementation of the example person location system of FIG. 1. In the illustrated example of FIG. 2, an example media presentation environment 200 includes the example media presentation device 108, the example first speaker 110, the example second speaker 112, the example first RF beacon 114, and the example second RF beacon 116. Additionally, the example media presentation environment 200 includes the first monitoring area 124 and the second monitoring area 126. In the example of FIG. 2, the first RF beacon 114 is assigned to monitor the first monitoring area 124 and the second RF beacon 116 is assigned to monitor the second monitoring area 126. In the example of FIG. 2, the first RF beacon 114 and the second RF beacon 116 are implemented by the same or substantially similar RF beacon model. In the example of FIG. 2, the first monitoring area 124 corresponds to the area covered by an armchair and the second monitoring area 126 corresponds to the area covered by a sectional couch.

In the illustrated example of FIG. 2, based on the monitoring area information collected by the panelists (e.g., the panelists 104, 106), the central facility 118 sets respective signal strength thresholds corresponding to the first RF beacon 114 and the second RF beacon 116. For example, because the first monitoring area 124 is smaller than the second monitoring area 126, the central facility 118 sets the signal strength threshold corresponding to the first RF beacon 114 to be greater than the signal strength threshold corresponding to the second RF beacon 116. In this manner, the central facility 118 decreases an example first detection area 202 (e.g., determined based on the diameter $D_0$) of the first RF beacon 114 as compared to an example second detection area 204 (e.g., determined based on the diameter $D_1$) of the second RF beacon 116.

Figure 3:
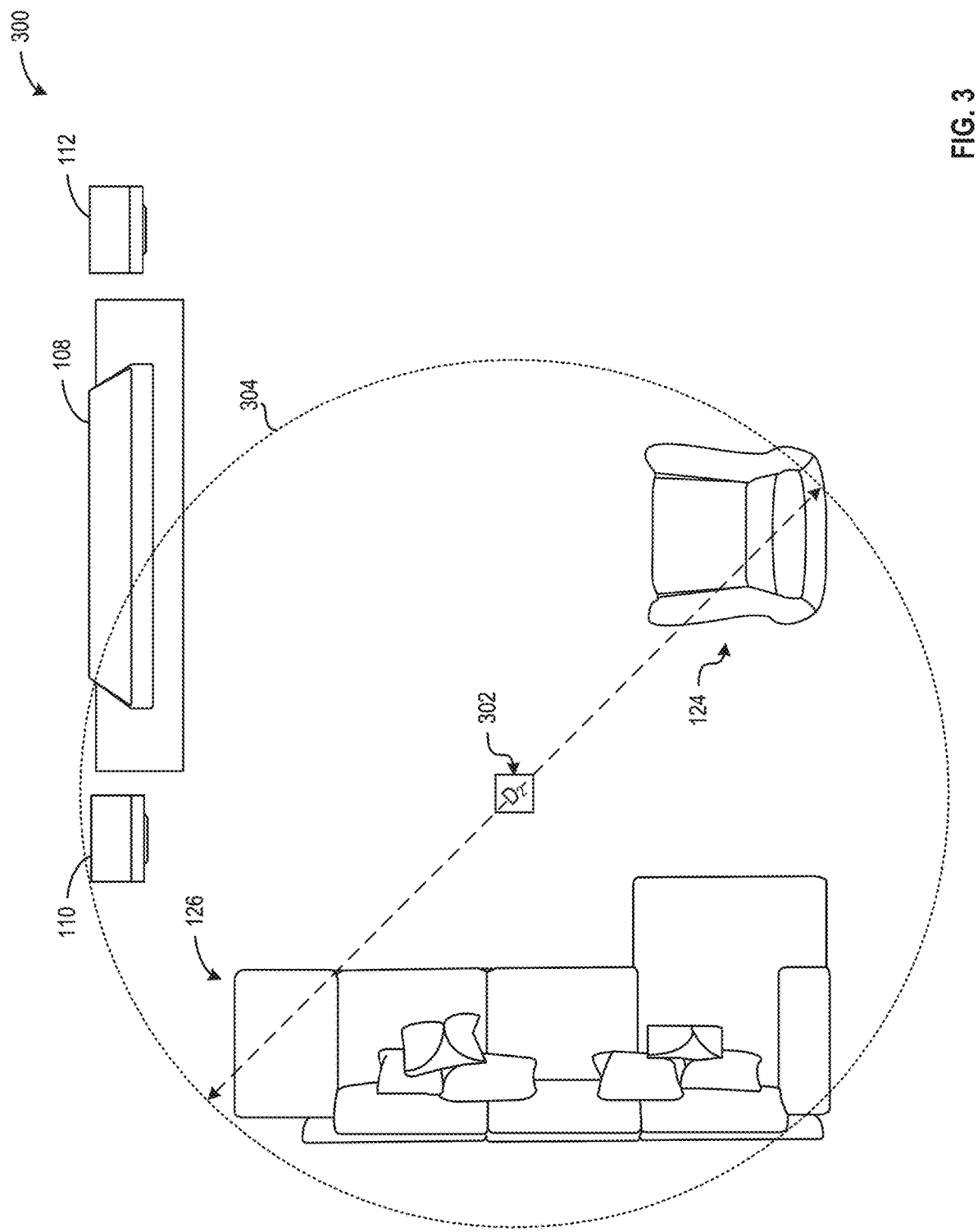
FIG. 3 illustrates an example second implementation of the example person location system of FIG. 1.

FIG. 3 illustrates an example second implementation of the example person location system of FIG. 1. In the illustrated example of FIG. 3, an example media presentation environment 300 includes the example media presentation device 108, the example first speaker 110, the example second speaker 112, and an example third RF beacon 302. Additionally, the example media presentation environment 300 includes the first monitoring area 124 and the second monitoring area 126. In the example of FIG. 3, the third RF beacon 302 is assigned to monitor the first monitoring area 124 and the second monitoring area 126. In the example of FIG. 3, the first monitoring area 124 corresponds to the area covered by an armchair and the second monitoring area 126 corresponds to the area covered by a sectional couch.

In the illustrated example of FIG. 3, based on the monitoring area information collected by the panelists (e.g., the panelists 104, 106), the central facility 118 sets a signal strength threshold corresponding to the third RF beacon 302. For example, because only the third RF beacon 302 has been deployed to the media presentation environment 300 to monitor the first monitoring area 124 and the second monitoring area 126, the central facility 118 sets the signal strength threshold corresponding to the third RF beacon 302 to be less than the signal strength thresholds corresponding to the first RF beacon 114 and the second RF beacon 116 of FIGS. 1 and/or 2. In this manner, the central facility 118 increases an example first detection area 304 (e.g., determined based on the diameter $D_2$) of the third RF beacon 302 as compared to the first detection area 202 of the first RF beacon 114 and the second detection area 204 of the second RF beacon 116.

Figure 4:
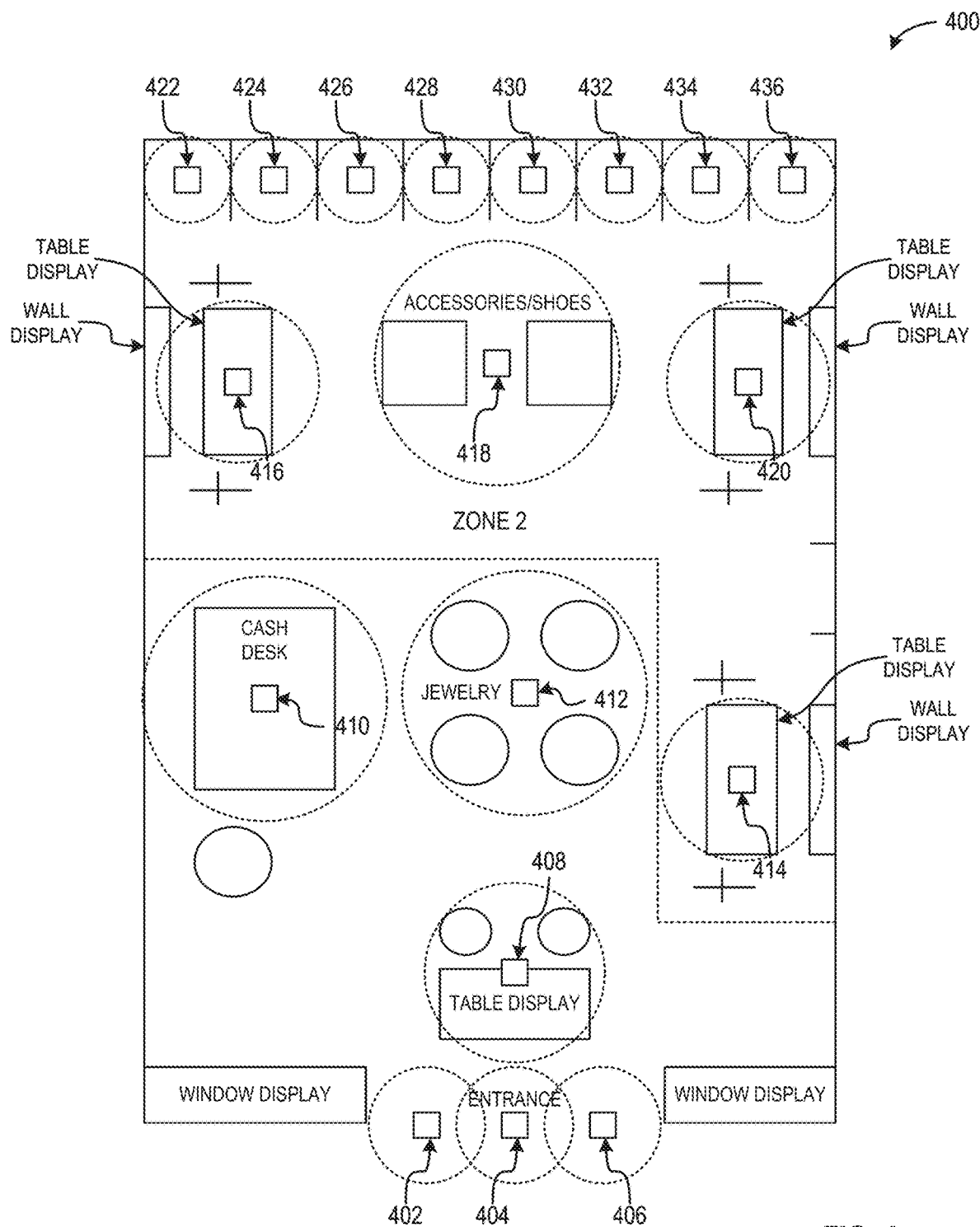
FIG. 4 illustrates an example third implementation of the example person location system of FIG. 1.

FIG. 4 illustrates an example third implementation of the example person location system of FIG. 1. In the illustrated example of FIG. 4, an example retail store 400 includes an example fourth RF beacon 402, an example fifth RF beacon 404, an example sixth RF beacon 406, an example seventh RF beacon 408, an example eighth RF beacon 410, an example ninth RF beacon 412, an example tenth RF beacon 414, an example eleventh RF beacon 416, an example twelfth RF beacon 418, an example thirteenth RF beacon 420, an example fourteenth RF beacon 422, an example fifteenth RF beacon 424, an example sixteenth RF beacon 426, an example seventeenth RF beacon 428, an example eighteenth RF beacon 430, an example nineteenth RF beacon 432, an example twentieth RF beacon 434, and an example twenty-first RF beacon 436. Additionally, the example retail store 400 includes various monitoring areas labelled in FIG. 4.

In the illustrated example of FIG. 4, the RF beacons (e.g., 402-436) are implemented by the same or substantially similar RF beacon model. Additionally, the RF beacons (e.g., 402-436) are assigned to the monitoring areas of the retail store 400 as illustrated in FIG. 4. For some monitoring areas, multiple RF beacons are assigned to the same monitoring area. For example, the fourth RF beacon 402, the fifth RF beacon 404, and the sixth RF beacon 406 are assigned to the monitoring area labeled "ENTRANCE." Based on the monitoring area information, the central facility 118 sets the signal strength thresholds corresponding to the RF beacons (e.g., 402-436) such that devices within the detection area of one or more RF beacon(s) assigned to one monitoring area will not detect other RF beacons assigned to other monitoring areas (e.g., such that respective detection areas of RF beacons assigned to different monitoring areas do not overlap). For example, the central facility 118 sets the signal strength thresholds corresponding to the fourth RF beacon 402, the fifth RF beacon 404, the sixth RF beacon 406, and the seventh RF beacon 408 such that devices within the detection areas of the fourth RF beacon 402, the fifth RF beacon 404, and the sixth RF beacon 406 (assigned to the monitoring area labeled "ENTRANCE") will not detect the seventh RF beacon 408 (assigned to the monitoring area labeled "TABLE DISPLAY").

Figure 5:
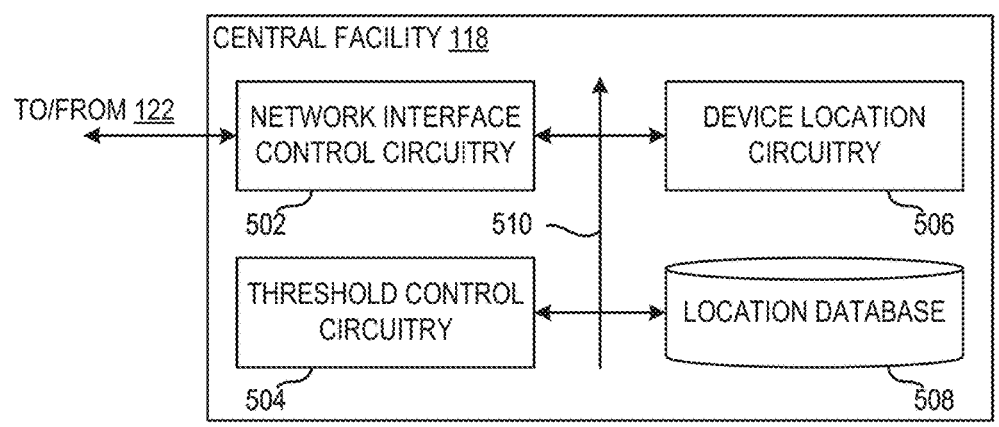
FIG. 5 is a block diagram illustrating an example implementation of the central facility of FIG. 1.

FIG. 5 is a block diagram illustrating an example implementation of the central facility 118 of FIG. 1. In the example of FIG. 5, the central facility 118 includes example network interface control circuitry 502, example threshold control circuitry 504, example device location circuitry 506, and an example location database 508. In the example of FIG. 5, any of the network interface control circuitry 502, the threshold control circuitry 504, the device location circuitry 506, and/or the location database 508 can communicate via an example communication bus 510.

In examples disclosed herein, the communication bus 510 may be implemented using any suitable wired and/or wireless communication. In additional or alternative examples, the communication bus 510 includes software, machine-readable instructions, and/or communication protocols by which information is communicated among the network interface control circuitry 502, the threshold control circuitry 504, the device location circuitry 506, and/or the location database 508.

In the illustrated example of FIG. 5, the network interface control circuitry 502 is implemented by one or more general purpose semiconductor-based electrical circuits programmed with instructions to perform specific operations and including one or more semiconductor-based logic devices (e.g., electrical hardware implemented by one or more transistors). In some examples, the network interface control circuitry 502 is implemented by processor circuitry, analog circuit(s), digital circuit(s), logic circuit(s), programmable processor(s), programmable microcontroller(s), GPU(s), DSP(s), ASIC(s), PLD(s) and/or FPLD(s) such as FPGAs. In some examples, the network interface control circuitry 502 is implemented by one or more transmitters, one or more receivers, and/or one or more transceivers. In the example of FIG. 5, the network interface control circuitry 502 controls communication between the central facility 118 and the network 122.

In the illustrated example of FIG. 5, the network interface control circuitry 502 collects monitoring area information from panelists (e.g., the panelists 104, 106). The network interface control circuitry 502 also transmits one or more signal strength thresholds to one or more devices (e.g., the first wireless device 128, the second wireless device 130, etc.) at one or more monitoring environments (e.g., the media presentation environment 102, the media presentation environment 200, the media presentation environment 300, the retail store 400, etc.). The network interface control circuitry 502 additionally or alternatively monitors the one or more devices at the one or more monitoring environments. The network interface control circuitry 502 additionally or alternatively determines whether monitoring information has been received from one or more monitored devices and/or queries the one or more monitored devices for monitoring information.

In the illustrated example of FIG. 5, in response to receiving monitoring information, the network interface control circuitry 502 determines whether the monitoring information includes one or more locations of the one or more monitored devices. In response to determining that the monitoring information includes one or more locations of the one or more monitored devices, the network interface control circuitry 502 forwards the one or more locations to the device location circuitry 506 to store in the location database 508. In response to determining that the monitoring information does not include one or more locations of the one or more monitored devices, the network interface control circuitry 502 forwards the monitoring information to the device location circuitry 506 to determine the one or more locations of the one or more monitored devices.

In some examples, the example central facility 118 includes means for controlling one or more communications. For examples, the means for controlling one or more communications may be implemented by the network interface control circuitry 502. In some examples, the network interface control circuitry 502 may be implemented by machine executable instructions and/or operations such as that implemented by at least blocks 702, 708, 710, 712, 714, and 720 of FIG. 7 executed and/or instantiated by processor circuitry, which may be implemented by the example processor circuitry 912 of FIG. 9, the example microprocessor 1000 of FIG. 10, and/or the example FPGA circuitry 1100 of FIG. 11. In other examples, the network interface control circuitry 502 is implemented by other hardware logic circuitry, hardware implemented state machines, and/or any other combination of hardware, software, and/or firmware. For example, the network interface control circuitry 502 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

In the illustrated example of FIG. 5, the threshold control circuitry 504 is implemented by one or more general purpose semiconductor-based electrical circuits programmed with instructions to perform specific operations and including one or more semiconductor-based logic devices (e.g., electrical hardware implemented by one or more transistors). In some examples, the threshold control circuitry 504 is implemented by processor circuitry, analog circuit(s), digital circuit(s), logic circuit(s), programmable processor(s), programmable microcontroller(s), GPU(s), DSP(s), ASIC(s), PLD(s) and/or FPLD(s) such as FPGAs. In the example of FIG. 5, the threshold control circuitry 504 determines one or more signal strength thresholds to set for respective RF beacons deployed to the monitoring environments.

In the illustrated example of FIG. 5, the threshold control circuitry 504 determines one or more signal strength thresholds to set for respective RF beacons deployed to the monitoring environments based on the monitoring area information of respective monitoring environments. For example, the threshold control circuitry 504 varies the signal strength threshold corresponding to an RF beacon depending on the monitoring area to be covered by the RF beacon as reported in the monitoring area information (e.g., the width of the monitoring area around the RF beacon). For example, the threshold control circuitry 504 sets one or more signal strength thresholds corresponding to RF beacons of the same or substantially similar hardware model based on a three-tiered scale that corresponds to small, medium, and large detection areas.

In some examples, if fewer RF beacons are deployed to a monitoring environment (e.g., to save on cost, to lessen the burden on a panelist, etc.), the threshold control circuitry 504 sets a lower signal strength threshold corresponding to each RF beacon to cover a greater distance and more area. Example Table 1 illustrates different configurations of RF beacons and signal strength thresholds and the accuracy of device location associated therewith. In the example of Table 1, the signal strength thresholds are illustrated as decibel levels below which a device shall not register detection of an RF beacon regardless of whether a beacon detection signal for the RF beacon was received by a device.

TABLE 1

| Number of RF Beacons Deployed | Signal Strength Threshold(s) | Accuracy |
|---|---|---|
| 4 | −60 dB | 97.37% |
| 3 | −62 dB | 99.55% |
| 2 | −66 dB | 97.79% |

In the illustrated example of FIG. 5, after determining the one or more signal strength thresholds to set for one or more RF beacons deployed to a monitoring environment, the threshold control circuitry 504 updates a signal strength threshold table maintained in the location database 508. For example, the signal strength threshold table includes the signal strength thresholds corresponding to respective RF beacons assigned to a monitoring environment (e.g., the media presentation environment 102).

In some examples, the example central facility 118 includes means for setting one or more thresholds. For example, the means for setting one or more thresholds may be implemented by the threshold control circuitry 504. In some examples, the threshold control circuitry 504 may be implemented by machine executable instructions and/or operations such as that implemented by at least blocks 704 and 706 of FIG. 7 executed and/or instantiated by processor circuitry, which may be implemented by the example processor circuitry 912 of FIG. 9, the example microprocessor 1000 of FIG. 10, and/or the example FPGA circuitry 1100 of FIG. 11. In other examples, the threshold control circuitry 504 is implemented by other hardware logic circuitry, hardware implemented state machines, and/or any other combination of hardware, software, and/or firmware. For example, the threshold control circuitry 504 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

In the illustrated example of FIG. 5, the device location circuitry 506 is implemented by one or more general purpose semiconductor-based electrical circuits programmed with instructions to perform specific operations and including one or more semiconductor-based logic devices (e.g., electrical hardware implemented by one or more transistors). In some examples, the device location circuitry 506 is implemented by processor circuitry, analog circuit(s), digital circuit(s), logic circuit(s), programmable processor(s), programmable microcontroller(s), GPU(s), DSP(s), ASIC(s), PLD(s) and/or FPLD(s) such as FPGAs. In the example of FIG. 5, the device location circuitry 506 determines one or more locations of one or more devices at a monitoring environment based on monitoring information from the monitoring environment.

In the illustrated example of FIG. 5, the device location circuitry 506 implements a Naive Bayes model to determine the location of one or more monitored devices. In examples disclosed herein, the central facility 118 performs supervised training to train the Naive Bayes model. For example, supervised training uses inputs and corresponding expected (e.g., labeled) outputs to select parameters (e.g., by iterating over combinations of select parameters) for the ML/AI model that reduce model error. However, different types of training may be performed based on the type of ML/AI model and/or the expected output. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training algorithm may additionally or alternatively be used. In examples disclosed herein, training is performed until an acceptable (e.g., threshold) amount of error is achieved and/or until an acceptable (e.g., threshold) accuracy is achieved. In examples disclosed herein, training is performed at the central facility 118. Training is performed using hyperparameters that control how the learning is performed (e.g., a learning rate, a number of layers to be used in the machine learning model, etc.). In examples disclosed herein, hyperparameters that control the number of RF beacons utilized to detect devices, the number of minutes of training, and the size of a smoothing window are used. Such hyperparameters are selected by, for example, an engineer and/or other person developing the ML/AI model. In some examples re-training may be performed. Such re-training may be performed in response to a change in the number of RF beacons deployed to a monitoring environment (e.g., the media presentation environment 102), a change to one or more of the signal strength thresholds of the one or more RF beacons deployed to the monitoring environment, among others.

Training is performed using training data. In examples disclosed herein, the training data originates from the engineer and/or other person developing the ML/AI model. For example, an engineer may collect a threshold amount of training data from an area known to be within a desired detection area of an RF beacon and a threshold amount of training data from an area known to be outside the desired detection area of the RF beacon. Because supervised training is used, the training data is labeled. Labeling is applied to the training data by the engineer and/or other person developing the ML/AI model.

Once training is complete, the model is deployed for use as an executable construct that processes an input and provides an output based on the network of nodes and connections defined in the model. The model is stored at the location database 508. The model may then be executed and/or instantiated by the device location circuitry 506. In some examples, the model may be stored in local storage of the first wireless device 128 and executed and/or instantiated by the first wireless device 128 (e.g., by the locator circuitry 132).

In some examples, the example central facility 118 includes means for locating one or more devices. For example, the means for locating one or more devices may be implemented by the device location circuitry 506. In some examples, the device location circuitry 506 may be implemented by machine executable instructions and/or operations such as that implemented by at least blocks 716 and 718 of FIG. 7 executed and/or instantiated by processor circuitry, which may be implemented by the example processor circuitry 912 of FIG. 9, the example microprocessor 1000 of FIG. 10, and/or the example FPGA circuitry 1100 of FIG. 11. In other examples, the device location circuitry 506 is implemented by other hardware logic circuitry, hardware implemented state machines, and/or any other combination of hardware, software, and/or firmware. For example, the device location circuitry 506 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

In the illustrated example of FIG. 5, the central facility 118 includes the location database 508 to record data (e.g., one or more signal strength threshold tables, one or more locations of monitored devices, monitoring information, monitoring area information, etc.). In the illustrated example, the location database 508 is a database storing signal strength thresholds corresponding to RF beacons deployed to monitoring environments, determined locations of devices within monitoring environments, monitoring information, and/or monitoring area information. In this manner, the threshold control circuitry 504, and/or, more generally, the central facility 118, can set and/or adjust signal strength thresholds corresponding to one or more RF beacons deployed to monitoring environments. Additionally, locations of devices can be maintained in the location database 508 for further processing to determine the unique audience size for media. Alternatively, the location database 508 may be any other type of database.

In the illustrated example of FIG. 5, the location database 508 may be implemented by a volatile memory (e.g., a Synchronous Dynamic Random-Access Memory (SDRAM), Dynamic Random-Access Memory (DRAM), RAMBUS Dynamic Random-Access Memory (RDRAM), etc.) and/or a non-volatile memory (e.g., flash memory). The location database 508 may additionally or alternatively be implemented by one or more double data rate (DDR) memories, such as DDR, DDR2, DDR3, DDR4, mobile DDR (mDDR), etc. The location database 508 may additionally or alternatively be implemented by one or more mass storage devices such as hard disk drive(s), compact disk drive(s), digital versatile disk drive(s), solid-state disk drive(s), etc.

While in the illustrated example the location database 508 is illustrated as a single database, the location database 508 may be implemented by any number and/or type(s) of databases. Furthermore, the data stored in the location database 508 may be in any data format such as, for example, binary data, comma delimited data, tab delimited data, structured query language (SQL) structures, etc. Alternatively, the location database 508 may be located externally to the central facility 118.

Figure 6:
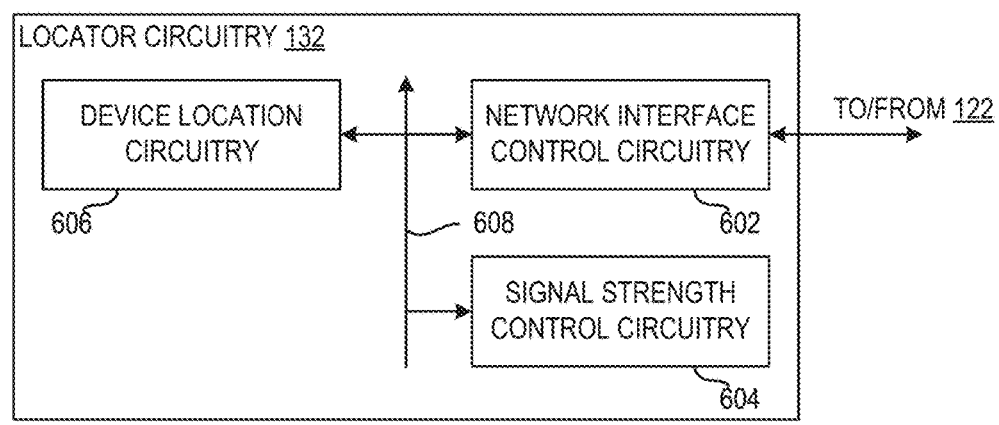
FIG. 6 is a block diagram illustrating an example implementation of example locator circuitry of an example first wireless device of FIG. 1.

FIG. 6 is a block diagram illustrating an example implementation of the example locator circuitry 132 of the example first wireless device 128 of FIG. 1. In the example of FIG. 6, the locator circuitry 132 includes example network interface control circuitry 602, example signal strength control circuitry 604, and example device location circuitry 606. In the example of FIG. 6, any of the network interface control circuitry 602, the signal strength control circuitry 604, and/or the device location circuitry 606 can communicate via an example communication bus 608.

In examples disclosed herein, the communication bus 608 may be implemented using any suitable wired and/or wireless communication. In additional or alternative examples, the communication bus 608 includes software, machine-readable instructions, and/or communication protocols by which information is communicated among the network interface control circuitry 602, the signal strength control circuitry 604, and/or the device location circuitry 606.

In the illustrated example of FIG. 6, the network interface control circuitry 602 is implemented by one or more general purpose semiconductor-based electrical circuits programmed with instructions to perform specific operations and including one or more semiconductor-based logic devices (e.g., electrical hardware implemented by one or more transistors). In some examples, the network interface control circuitry 602 is implemented by processor circuitry, analog circuit(s), digital circuit(s), logic circuit(s), programmable processor(s), programmable microcontroller(s), GPU(s), DSP(s), ASIC(s), PLD(s) and/or FPLD(s) such as FPGAs. In some examples, the network interface control circuitry 602 is implemented by one or more transmitters, one or more receivers, and/or one or more transceivers. In the example of FIG. 6, the network interface control circuitry 602 controls communication between the locator circuitry 132 and the gateway 120.

In the illustrated example of FIG. 6, the network interface control circuitry 602 monitors the central facility 118 for a communication including one or more signal strength thresholds. The example network interface control circuitry 602 additionally determines whether the one or more signal strength thresholds are updated relative to the one or more signal strength thresholds currently maintained by the device location circuitry 606. In response to the network interface control circuitry 602 determining that one or more signal strength thresholds are updated relative to the one or more signal strength thresholds currently maintained by the device location circuitry 606, the network interface control circuitry transmits the updated one or more signal strength thresholds to the device location circuitry 606.

In the illustrated example of FIG. 6, the network interface control circuitry 602 determines whether one or more beacon detection signals have been received from one or more RF beacons at a monitoring environment (e.g., the media presentation environment 102). As described above, a beacon detection signal includes an identifier of the RF beacon that transmitted the beacon detection signal and location determination information. Additionally, as described above, example location determination information includes the known signal strength a set distance from the RF beacon that transmitted the beacon detection signal. In response to the network interface control circuitry 602 determining that one or more beacon detection signals have been received, the network interface control circuitry 602 forwards the one or more beacon detection signals to the signal strength control circuitry 604. In the example of FIG. 6, in response to a determination to perform device location locally, the network interface control circuitry 602 transmits the location of the device to the central facility 118. In response to a determination not to perform device location locally, the network interface control circuitry 602 transmits respective identifiers of one or more RF beacons that transmitted one or more beacon detection signals received by the locator circuitry 132, respective location determination information, and respective signal strengths of the one or more beacon detection signals received by the by the locator circuitry 132 to the central facility 118.

In some examples, the example locator circuitry 132 includes means for controlling one or more communications. For example, the means for controlling one or more communications may be implemented by the network interface control circuitry 602. In some examples, the network interface control circuitry 602 may be implemented by machine executable instructions and/or operations such as that implemented by at least blocks 802, 804, 808, 814, and 818 of FIG. 8 executed and/or instantiated by processor circuitry, which may be implemented by the example processor circuitry 1212 of FIG. 12, the example microprocessor 1300 of FIG. 13, and/or the example FPGA circuitry 1400 of FIG. 14. In other examples, the network interface control circuitry 602 is implemented by other hardware logic circuitry, hardware implemented state machines, and/or any other combination of hardware, software, and/or firmware. For example, the network interface control circuitry 602 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

In the illustrated example of FIG. 6, the signal strength control circuitry 604 is implemented by one or more general purpose semiconductor-based electrical circuits programmed with instructions to perform specific operations and including one or more semiconductor-based logic devices (e.g., electrical hardware implemented by one or more transistors). In some examples, the signal strength control circuitry 604 is implemented by processor circuitry, analog circuit(s), digital circuit(s), logic circuit(s), programmable processor(s), programmable microcontroller(s), GPU(s), DSP(s), ASIC(s), PLD(s) and/or FPLD(s) such as FPGAs. In the example of FIG. 6, the signal strength control circuitry 604 determines the signal strength of one or more beacon detection signals received by the locator circuitry 132.

In some examples, the locator circuitry 132 includes means for determining signal strength. For example, the means for determining signal strength may be implemented by the signal strength control circuitry 604. In some examples, the signal strength control circuitry 604 may be implemented by machine executable instructions and/or operations such as that implemented by at least block 810 of FIG. 8 executed and/or instantiated by processor circuitry, which may be implemented by the example processor circuitry 1212 of FIG. 12, the example microprocessor 1300 of FIG. 13, and/or the example FPGA circuitry 1400 of FIG. 14. In other examples, the signal strength control circuitry 604 is implemented by other hardware logic circuitry, hardware implemented state machines, and/or any other combination of hardware, software, and/or firmware. For example, the signal strength control circuitry 604 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

In the illustrated example of FIG. 6, the device location circuitry 606 is implemented by one or more general purpose semiconductor-based electrical circuits programmed with instructions to perform specific operations and including one or more semiconductor-based logic devices (e.g., electrical hardware implemented by one or more transistors). In some examples, the device location circuitry 606 is implemented by processor circuitry, analog circuit(s), digital circuit(s), logic circuit(s), programmable processor(s), programmable microcontroller(s), GPU(s), DSP(s), ASIC(s), PLD(s) and/or FPLD(s) such as FPGAs. In the example of FIG. 6, the device location circuitry 606 determines one or more locations of one or more devices at a monitoring environment based on the signal strength(s) of one or more beacon detection signals received by the one or more devices, the associated location determination information, and the corresponding signal strength thresholds.

In the illustrated example of FIG. 6, the device location circuitry 606 implements a Naive Bayes model to determine the location of one or more monitored devices. In examples disclosed herein, the Naive Bayes model may be deployed by the central facility 118. In the example of FIG. 6, the Naive Bayes model is trained by the central facility 118.

In some examples, the locator circuitry 132 includes means for locating one or more devices. For example, the means for locating one or more devices may be implemented by the device location circuitry 606. In some examples, the device location circuitry 606 may be implemented by machine executable instructions and/or operations such as that implemented by at least blocks 806, 812, 816, and 820 of FIG. 8 executed and/or instantiated by processor circuitry, which may be implemented by the example processor circuitry 1212 of FIG. 12, the example microprocessor 1300 of FIG. 13, and/or the example FPGA circuitry 1400 of FIG. 14. In other examples, the device location circuitry 606 is implemented by other hardware logic circuitry, hardware implemented state machines, and/or any other combination of hardware, software, and/or firmware. For example, the device location circuitry 606 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

While an example manner of implementing the central facility 118 of FIG. 1 is illustrated in FIG. 5, one or more of the elements, processes, and/or devices illustrated in FIG. 5 may be combined, divided, re-arranged, omitted, eliminated, and/or implemented in any other way. Additionally, while an example manner of implementing the locator circuitry 132 of FIG. 1 is illustrated in FIG. 6, one or more of the elements, processes and/or devices illustrated in FIG. 6 may be combined, divided, re-arranged, omitted, eliminated and/or implemented in any other way. Further, the example network interface control circuitry 502, the example threshold control circuitry 504, the example device location circuitry 506, the example location database 508, and/or, more generally, the example central facility 118 of FIG. 5 and/or the example network interface control circuitry 602, the example signal strength control circuitry 604, the example device location circuitry 606, and/or, more generally, the example locator circuitry 132 of FIG. 6, may be implemented by hardware, software, firmware, and/or any combination of hardware, software, and/or firmware. Thus, for example, any of the example network interface control circuitry 502, the example threshold control circuitry 504, the example device location circuitry 506, the example location database 508, and/or, more generally, the example central facility 118 of FIG. 5 and/or the example network interface control circuitry 602, the example signal strength control circuitry 604, the example device location circuitry 606, and/or, more generally, the example locator circuitry 132 of FIG. 6, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example network interface control circuitry 502, the example threshold control circuitry 504, the example device location circuitry 506, the example location database 508, the example network interface control circuitry 602, the example signal strength control circuitry 604, and/or the example device location circuitry 606 is/are hereby expressly defined to include a non-transitory computer readable storage device or storage disk such as a memory, a digital versatile disk (DVD), a compact disk (CD), a Blu-ray disk, etc., including the software and/or firmware. Further still, the example central facility 118 of FIG. 1 may include one or more elements, processes, and/or devices in addition to, or instead of, those illustrated in FIG. 5, and/or may include more than one of any or all of the illustrated elements, processes, and devices. Additionally, the example locator circuitry 132 of FIG. 1 may include one or more elements, processes, and/or devices in addition to, or instead of, those illustrated in FIG. 6.

Figure 7:
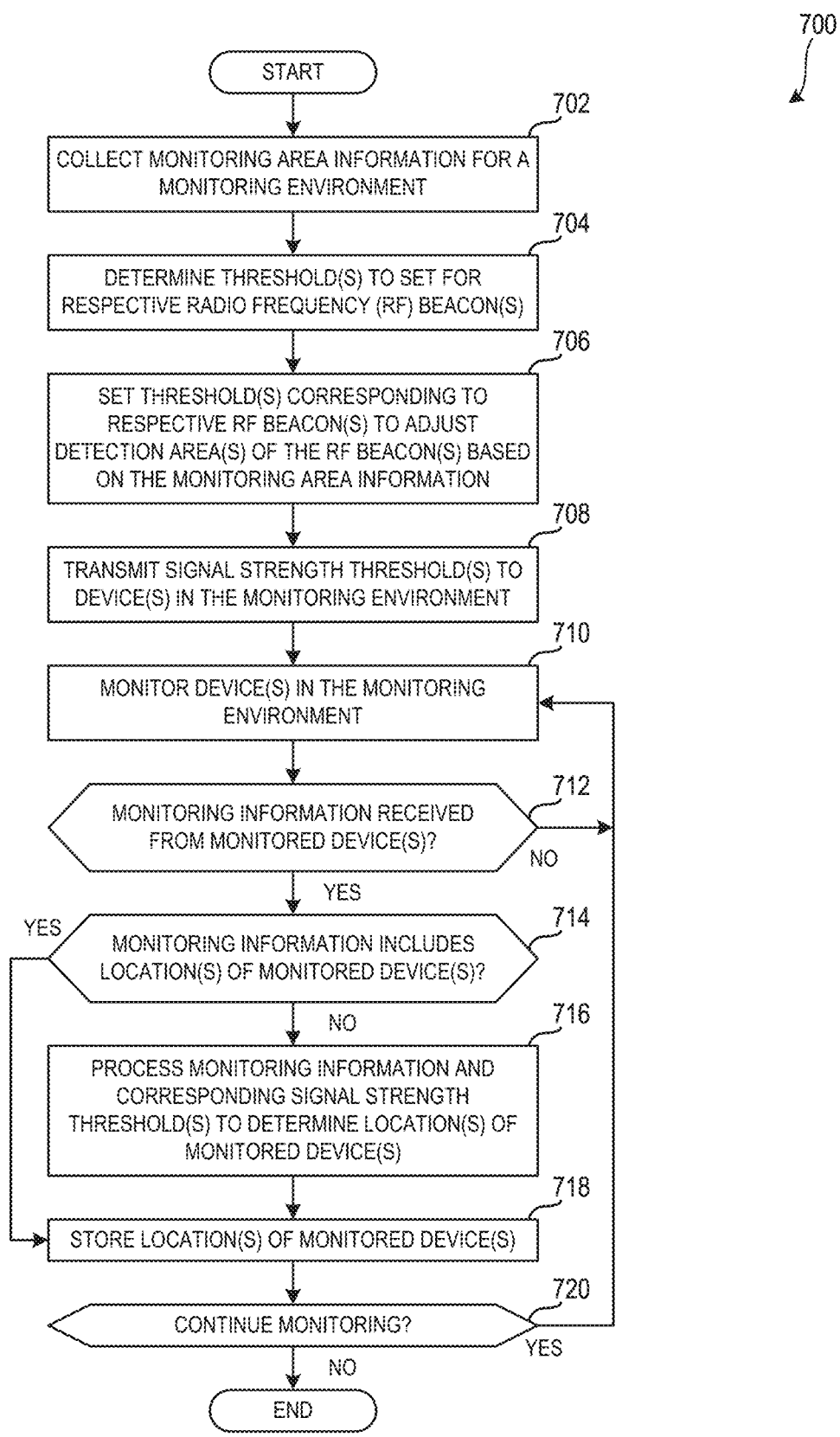
FIG. 7 is a flowchart representative of example machine-readable instructions and/or example operations that may be executed and/or instantiated by example processor circuitry to implement the central facility of FIGS. 1 and/or 5.

A flowchart representative of example hardware logic circuitry, machine-readable instructions and/or operations, hardware implemented state machines, and/or any combination thereof for implementing the central facility 118 of FIG. 1 is shown in FIG. 7. The machine-readable instructions and/or operations of FIG. 7 may be one or more executable and/or instantiate-able programs or portion(s) of an executable and/or instantiate-able program for execution and/or instantiation by processor circuitry, such as the processor circuitry 1212 shown in the example processor platform 1200 discussed below in connection with FIG. 12 and/or the example processor circuitry discussed below in connection with FIGS. 13 and/or 14. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or non-volatile memory (e.g., FLASH memory, an HDD, etc.) associated with processor circuitry located in one or more hardware devices, but the entire program and/or parts thereof could alternatively be executed and/or instantiated by one or more hardware devices other than the processor circuitry and/or embodied in firmware or dedicated hardware. The machine-readable instructions and/or operations of FIG. 7 may be distributed across multiple hardware devices and/or executed and/or instantiated by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices.

Figure 8:
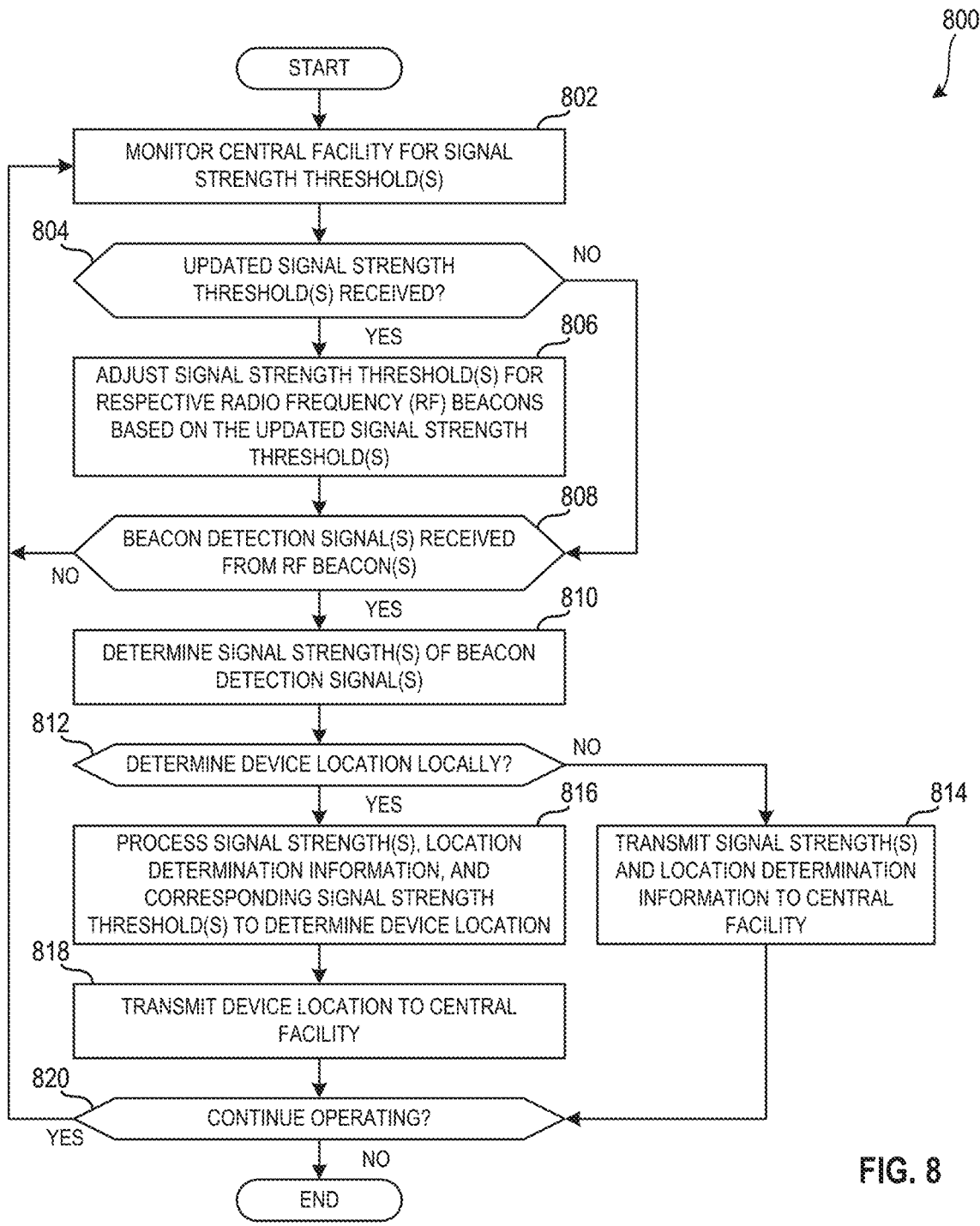
FIG. 8 is a flowchart representative of example machine-readable instructions and/or example operations that may be executed and/or instantiated by example processor circuitry to implement the example locator circuitry of FIGS. 1 and/or 6.

A flowchart representative of example hardware logic circuitry, machine-readable instructions and/or operations, hardware implemented state machines, and/or any combination thereof for implementing the locator circuitry 132 of FIG. 1 is shown in FIG. 8. The machine-readable instructions and/or operations of FIG. 8 may be one or more executable and/or instantiate-able programs or portion(s) of an executable and/or instantiate-able program for execution and/or instantiation by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed and/or instantiated by one or more hardware devices other than the processor circuitry and/or embodied in firmware or dedicated hardware. The machine-readable instructions and/or operations of FIG. 8 may be distributed across multiple hardware devices and/or executed and/or instantiated by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device).

Similarly, the non-transitory computer readable storage media may include one or more mediums located in one or more hardware devices.

Further, although the example program(s) is/are described with reference to the flowcharts illustrated in FIG. 7 and/or FIG. 8, many other methods of implementing the example central facility 118 and/or the locator circuitry 132 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7 and/or 8 may be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of machine-readable instructions and/or example operations 700 that may be executed and/or instantiated by processor circuitry to implement the central facility 118 of FIGS. 1 and/or 5. The machine-readable instructions and/or operations 700 begin at block 702 where the network interface control circuitry 502 collects monitoring area information for a monitoring environment. For example, at block 702, the network interface control circuitry 502 collects monitoring area information from one or more panelists (e.g., the panelists 104, 106). In some examples, one or more devices associated with one or more third parties (e.g., not the AME) collect monitoring area information from one or more panelists and transmit (e.g., electronically, by mail, etc.) the monitoring area information to the network interface control circuitry 502. At block 704, the threshold control circuitry 504 determines one or more signal strength thresholds to set for respective RF beacons deployed to the monitoring environment based on the monitoring area information. For example, at block 704, the threshold control circuitry 504 varies the signal strength thresholds corresponding to one or more RF beacons depending on the respective monitoring areas to be covered by the one or more RF beacons as reported in the monitoring area information (e.g., the width of the monitoring area around the RF beacon).

In the illustrated example of FIG. 7, at block 706, the threshold control circuitry 504 sets one or more signal strength thresholds corresponding to the respective RF beacons to adjust one or more detection areas of respective RF beacons based on the monitoring area information. For example, at block 706, the threshold control circuitry 504 updates a signal strength threshold table maintained in the location database 508. At block 708, the network interface control circuitry 502 transmits the one or more signal strength thresholds to one or more devices in the monitoring environment, As described above, in some examples, the one or more devices in the monitoring environment do not include location determination capability. In such examples, block 708 may be omitted. At block 710, the network interface control circuitry 502 monitors one or more devices in the monitoring environment. In some examples, the network interface control circuitry 502 monitors one or more devices associated with one or more third parties that serve as intermediaries between the one or more devices at the monitoring environment and the network interface control circuitry 502.

In the illustrated example of FIG. 7, at block 712, the network interface control circuitry 502 determines whether monitoring information has been received from the one or more monitored devices. In some examples, the network interface control circuitry 502 determines whether monitoring information has been received from the one or more devices associated with one or more third parties that serve as intermediaries between the one or more monitored devices and the network interface control circuitry 502. In response to the network interface control circuitry 502 determining that monitoring information has not been received from any of the monitored devices (block 712: NO), the machine-readable instructions and/or operations 700 return to block 710. In response to the network interface control circuitry 502 determining that monitoring information has been received from at least one of the monitored devices (block 712: YES), the machine-readable instructions and/or operations 700 proceed to block 714.

In the illustrated example of FIG. 7, at block 714, the network interface control circuitry 502 determines whether the monitoring information includes respective locations of the one or more monitored devices. In response to the network interface control circuitry 502 determining that the monitoring information does not include any locations of any of the one or more monitored devices (block 714: NO), the machine-readable instructions and/or operations 700 proceed to block 716. In response to the network interface control circuitry 502 determining that the monitoring information includes at least one location of at least one of the one or more monitored devices (block 714: YES), the machine-readable instructions and/or operations 700 proceed to block 718.

In the illustrated example of FIG. 7, at block 716, the device location circuitry 506 processes the monitoring information and the corresponding signal strength threshold(s) to determine the respective locations of the one or more monitored devices. For example, at block 716, after reception of monitoring information from one or more devices in the monitoring environment, the device location circuitry 506 processes the monitoring information and corresponding one or more signal strength thresholds to determine the respective locations of the one or more monitored devices in the monitoring environment. For example, at block 716, the device location circuitry 506 implements a Naive Bayes model to determine the respective locations of one or more monitored devices. At block 718, the device location circuitry 506 stores the respective locations of the one or more monitored devices in the location databases 508.

In the illustrated example of FIG. 7, at block 720, the network interface control circuitry 502 determines whether to continue monitoring. For example, the network interface control circuitry 502 determines to discontinue monitoring in response to a notification that the monitoring environment is no longer being monitored by the central facility 118. In response to the network interface control circuitry 502 determining to continue monitoring (block 720: YES), the machine-readable instructions and/or operations 700 return to block 710. In response to the network interface control circuitry 502 determining not to continue monitoring (block 720: NO), the machine-readable instructions and/or operations 700 terminate.

FIG. 8 is a flowchart representative of machine-readable instructions and/or operations 800 which may be executed and/or instantiated to implement the example locator circuitry 132 of FIGS. 1 and/or 6. The machine-readable instructions and/or operations 800 begin at block 802 where the network interface control circuitry 602 monitors the central facility 118 for one or more signal strength thresholds corresponding to one or more RF beacons. At block 804, the network interface control circuitry 602 determines whether the one or more signal strength thresholds are updated relative to the one or more signal strength thresholds currently maintained by the device location circuitry 606. In response to the network interface control circuitry 602 determining that one or more updated signal strength thresholds have been received (block 804: YES), the machine-readable instructions and/or operations 800 proceed to block 806. In response to the network interface control circuitry 602 determining that one or more updated signal strength thresholds have not been received (block

804: NO), the machine-readable instructions and/or operations 800 proceed to block 808.

In the illustrated example of FIG. 8, at block 806, the device location circuitry 606 adjusts one or more signal strength thresholds for respective RF beacons based the one or more updated signal strength thresholds. At block 808, the network interface control circuitry 602 determines whether one or more beacon detection signals have been received from one or more RF beacons deployed at the monitoring environment in which a device including the locator circuitry 132 is present. In response to the network interface control circuitry 602 determining that one or more beacon detection signals have been received (block 808: YES), the machine-readable instructions and/or operations 800 proceed to block 810. In response to the network interface control circuitry 602 determining that one or more beacon detection signals have not been received (block 808: NO), the machine-readable instructions and/or operations 800 return to block 802. At block 810, the signal strength control circuitry 604 determines respective signal strengths of the one or more beacon detection signals.

In the illustrated example of FIG. 8, at block 812, the device location circuitry 606 determines whether to determine the location of the device including the locator circuitry 132 locally. For example, the device location circuitry 606 determines whether to determine the location of the device including the locator circuitry 132 locally based on the power level of the device. In response to the device location circuitry 606 determining to determine the location of the device including the locator circuitry 132 locally (block 812: YES), the machine-readable instructions and/or operations 800 proceed to block 816. In response to the device location circuitry 606 determining not to determine the location of the device including the locator circuitry 132 locally (block 812: NO), the machine-readable instructions and/or operations 800 proceed to block 814.

In the illustrated example of FIG. 8, at block 814, the network interface control circuitry 602 transmits the respective identifiers of one or more RF beacons that transmitted one or more beacon detection signals received by the locator circuitry 132, the respective location determination information, and the respective signal strengths of the one or more beacon detection signals received by the by the locator circuitry 132 to the central facility 118. In some examples, the network interface control circuitry 602 transmits the respective identifiers of one or more RF beacons that transmitted one or more beacon detection signals received by the locator circuitry 132, the respective location determination information, and the respective signal strengths of the one or more beacon detection signals received by the by the locator circuitry 132 to the one or more devices associated with one or more third parties that serve as intermediaries between the device including the locator circuitry 132 and the central facility 118. At block 816, the device location circuitry 606 processes the respective signal strengths of one or more beacon detection signals received by the by the locator circuitry 132, the respective location determination information, and the signal strengths thresholds to determine the location of the device including the locator circuitry 132. For example, at block 816, the device location circuitry 606 implements a Naive Bayes model to determine the location of one or more monitored devices.

In the illustrated example of FIG. 8, at block 818, the network interface control circuitry 602 transmits the location of the device including the locator circuitry 132 to the central facility 118. In some examples, the network interface control circuitry 602 transmits the location of the device including the locator circuitry 132 to the one or more devices associated with one or more third parties that serve as intermediaries between the device including the locator circuitry 132 and the central facility 118. At block 820, the device location circuitry 606 determines whether to continue operating. For example, the device location circuitry 606 determines to discontinue operation in response to a request to remove (e.g., uninstall) an application instantiated by the locator circuitry 132 and/or in response to closure of an application instantiated by the locator circuitry 132.

In the illustrated example of FIG. 8, in some examples, the device location circuitry 606 determines to discontinue operation in response to powering off the device including the locator circuitry 132 and/or in response to a notification that the monitoring environment is no longer being monitored by the central facility 118. In response to the device location circuitry 606 determining to continue operating (block 820: YES), the machine-readable instructions and/or operations 800 return to block 802. In response to the device location circuitry 606 determining not to continue operating (block 820: NO), the machine-readable instructions and/or operations 800 terminate. As described above, in some examples, the location circuitry 132 does not include location determination capability. In such examples, blocks 802, 804, 806, 812, 816, and 818 may be omitted.

Figure 9:
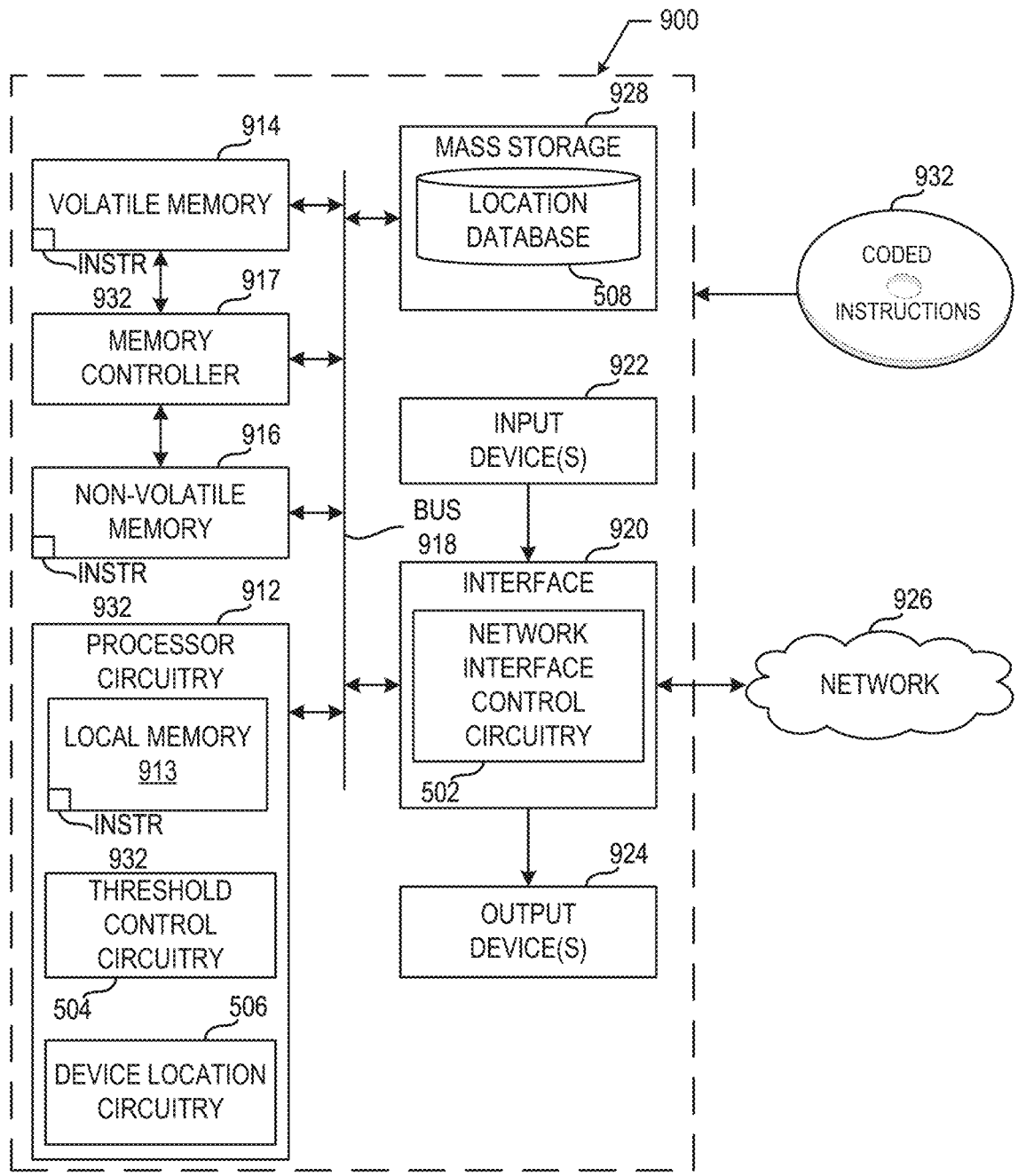
FIG. 9 is a block diagram of an example processing platform including processor circuitry structured to execute and/or instantiate the example machine-readable instructions and/or example operations of FIG. 7 to implement the central facility of FIGS. 1 and/or 5.

FIG. 9 is a block diagram of an example processor platform 900 structured to execute and/or instantiate the machine-readable instructions and/or operations of FIG. 7 to implement the central facility 118 of FIGS. 1 and/or 5. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.), or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example threshold control circuitry 504 and the example device location circuitry 506.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random-Access Memory (SDRAM), Dynamic Random-Access Memory (DRAM), RAMBUS® Dynamic Random-Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or a graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc. In this example, the interface circuitry 920 implements the example network interface control circuitry 502. In additional or alternative examples, the processor circuitry 912 implements the example network interface control circuitry 502.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices, and DVD drives. In this example, the mass storage device(s) implement the example location database 508.

The machine executable instructions 932, which may be implemented by the machine-readable instructions and/or operations 700 of FIG. 7, may be stored in the mass storage device 928, in the volatile memory 914, in the non-volatile memory 916, and/or on a removable non-transitory computer readable storage medium such as a CD or DVD.

Figure 10:
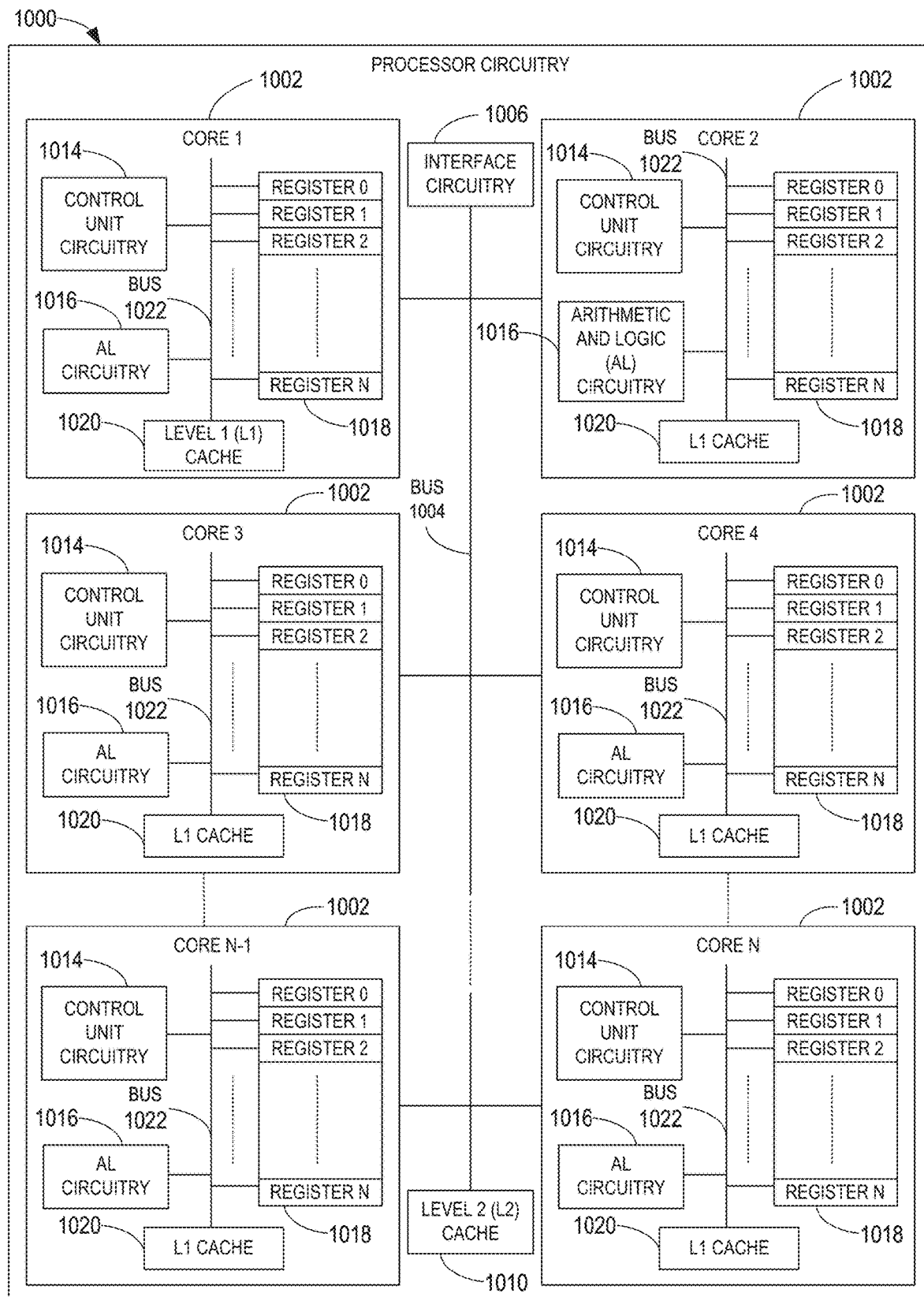
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine-readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine-readable instructions and/or operations represented by the flowchart of FIG. 7.

The cores 1002 may communicate by an example first bus 1004. In some examples, the first bus 1004 may implement a communication bus to effectuate communication associated with one(s) of the cores 1002. For example, the first bus 1004 may implement at least one of an Inter-Integrated Circuit (I2C) bus, a Serial Peripheral Interface (SPI) bus, a PCI bus, or a PCIe bus. Additionally or alternatively, the first bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry 1016 (sometimes referred to as an ALU 1016 and/or arithmetic and logic circuitry 1016), a plurality of registers 1018, the L1 cache 1020, and an example second bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control data movement (e.g., coordinate data movement) within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may implement at least one of an I2C bus, a SPI bus, a PCI bus, or a PCIe bus.

Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)), and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
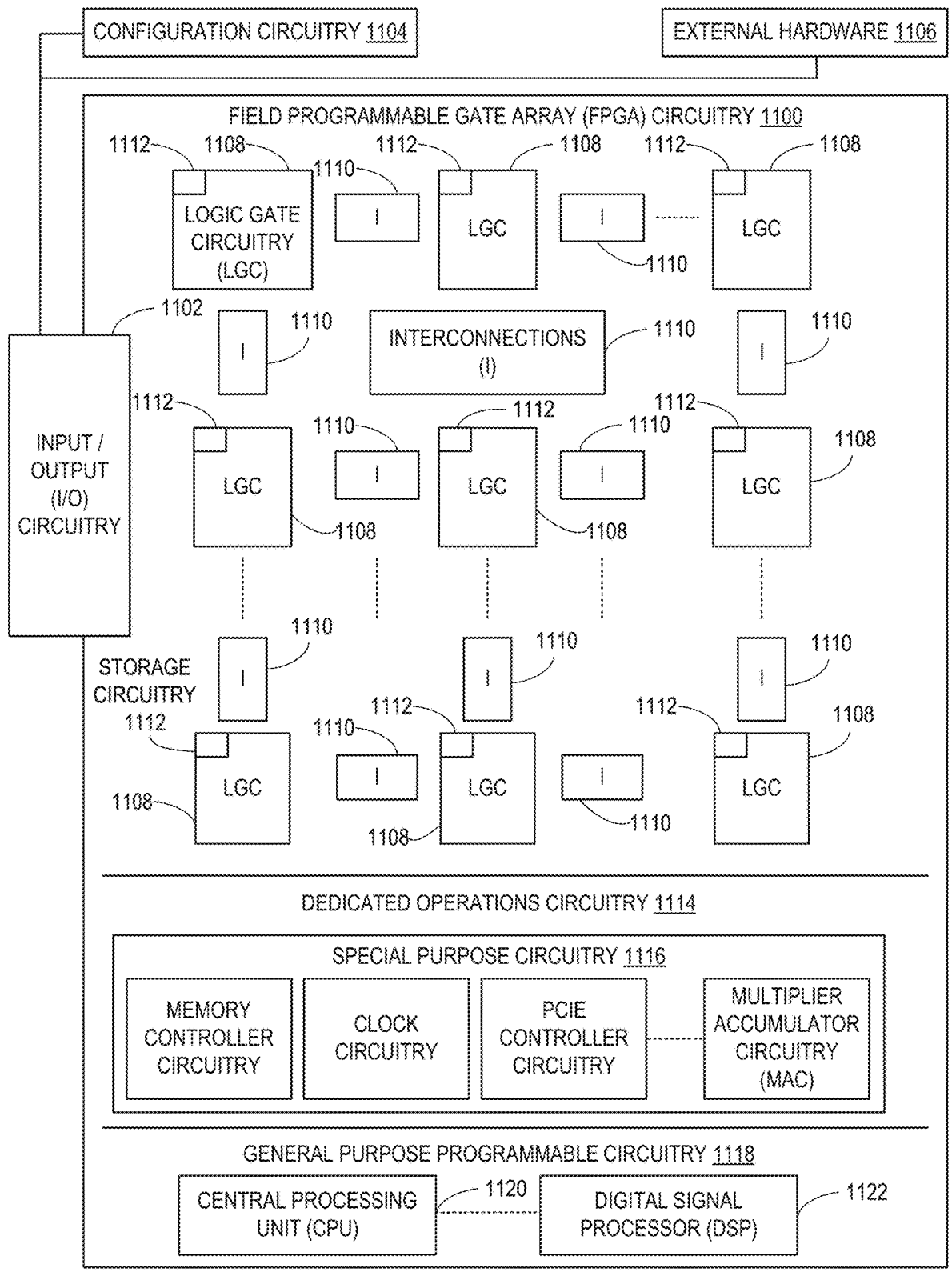
FIG. 11 is a block diagram of an example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor 1000 of FIG. 10 executing corresponding machine-readable instructions. However, once configured, the FPGA circuitry 1100 instantiates the machine-readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine-readable instructions and/or operations represented by the flowchart of FIG. 7 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine-readable instructions and/or operations represented by the flowchart of FIG. 7. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowchart of FIG. 7. As such, the FPGA circuitry 1100 may be structured to effectively instantiate some or all of the machine-readable instructions and/or operations of the flowchart of FIG. 7 as dedicated logic circuits to perform the operations corresponding to those software instructions in a dedicated manner analogous to an ASIC. Therefore, the FPGA circuitry 1100 may perform the operations corresponding to the some or all of the machine-readable instructions and/or operations of FIG. 7 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine-readable instructions to configure the FPGA circuitry 1100, or portion(s) thereof. In some such examples, the configuration circuitry 1104 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine-readable instructions and/or operations of FIG. 7 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine-readable instructions and/or operations represented by the flowchart of FIG. 7 may be executed by one or more of the cores 1002 of FIG. 10 and a second portion of the machine-readable instructions and/or operations represented by the flowchart of FIG. 7 may be executed by the FPGA circuitry 1100 of FIG. 11.

In some examples, the processor circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
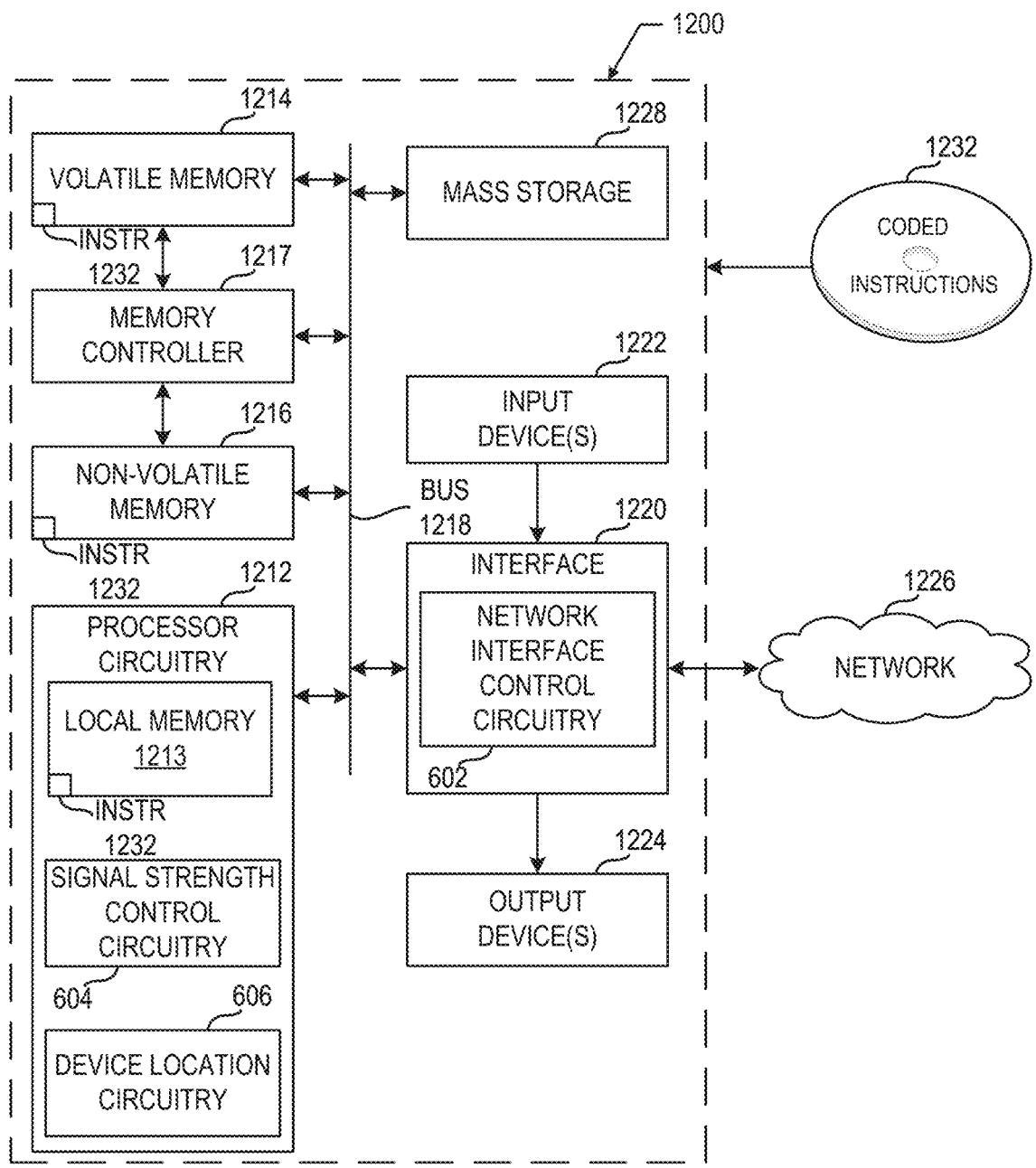
FIG. 12 is a block diagram of an example processing platform including processor circuitry structured to execute and/or instantiate the example machine-readable instructions and/or example operations of FIG. 8 to implement the locator circuitry of FIGS. 1 and/or 6.

FIG. 12 is a block diagram of an example processor platform 1200 structured to execute and/or instantiate the machine-readable instructions and/or operations of FIG. 8 to implement the locator circuitry 132 of FIGS. 1 and/or 6. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.), or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the example signal strength control circuitry 604 and the example device location circuitry 606.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random-Access Memory (SDRAM), Dynamic Random-Access Memory (DRAM), RAMBUS® Dynamic Random-Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output devices 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc. In this example, the interface circuitry 1220 implements the example network interface control circuitry 602. In additional or alternative examples, the processor circuitry 1212 implements the example network interface control circuitry 602.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1232, which may be implemented by the machine-readable instructions and/or operations 800 of FIG. 8, may be stored in the mass storage device 1228, in the volatile memory 1214, in the non-volatile memory 1216, and/or on a removable non-transitory computer readable storage medium such as a CD or DVD.

Figure 13:
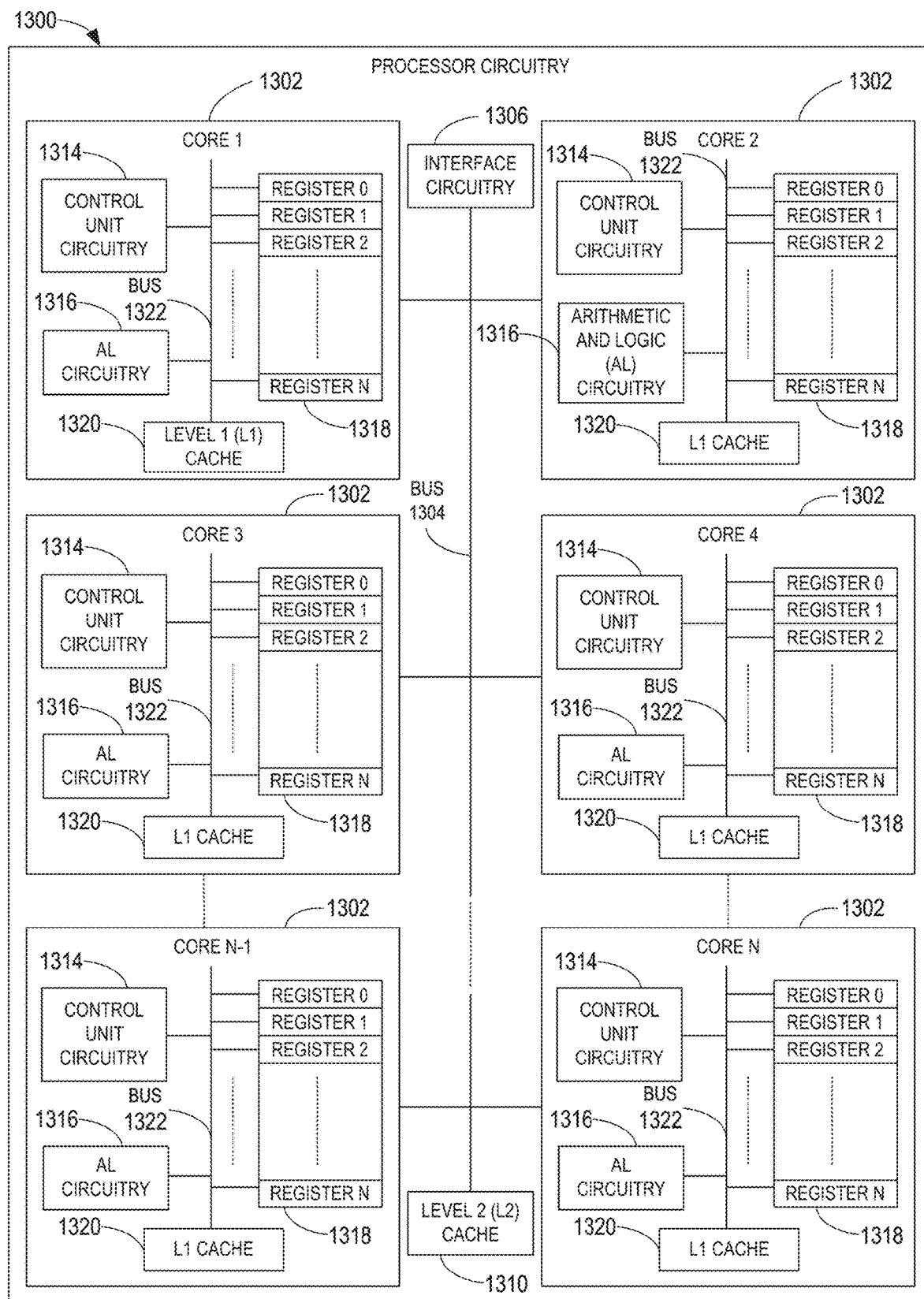
FIG. 13 is a block diagram of an example implementation of the processor circuitry of FIG. 12.

FIG. 13 is a block diagram of an example implementation of the processor circuitry 1212 of FIG. 12. In this example, the processor circuitry 1212 of FIG. 12 is implemented by a microprocessor 1300. For example, the microprocessor 1300 may implement multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine-readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine-readable instructions and/or operations represented by the flowchart of FIG. 8.

The cores 1302 may communicate by an example first bus 1304. In some examples, the first bus 1304 may implement a communication bus to effectuate communication associated with one(s) of the cores 1302. For example, the first bus 1304 may implement at least one of an Inter-Integrated Circuit (I2C) bus, a Serial Peripheral Interface (SPI) bus, a PCI bus, or a PCIe bus. Additionally or alternatively, the first bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2_cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry 1316 (sometimes referred to as an ALU 1316 and/or arithmetic and logic circuitry 1316), a plurality of registers 1318, the L1 cache 1320, and an example second bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control data movement (e.g., coordinate data movement) within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The second bus 1322 may implement at least one of an I2C bus, a SPI bus, a PCI bus, or a PCIe bus.

Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
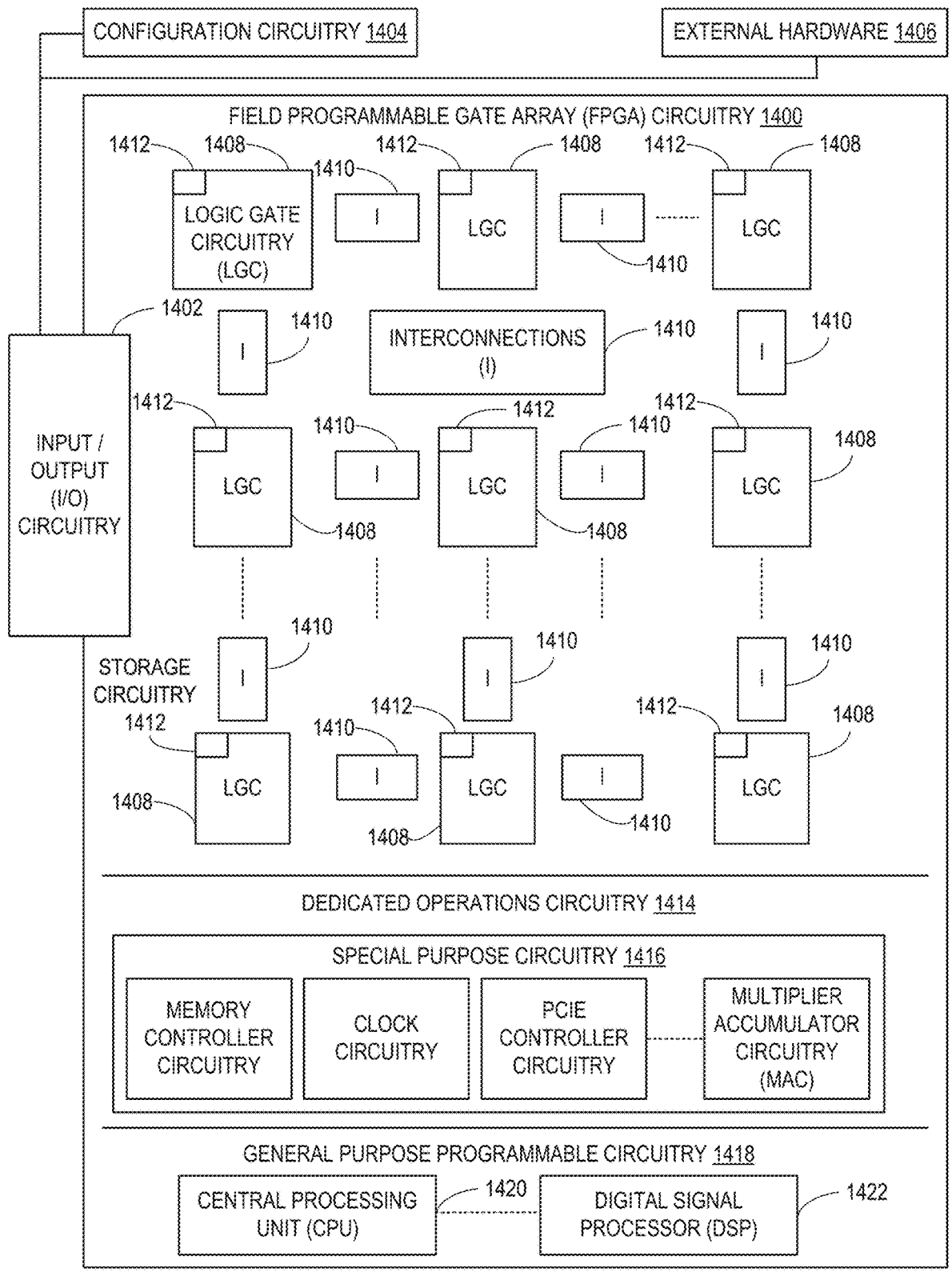
FIG. 14 is a block diagram of an example implementation of the processor circuitry of FIG. 12.

FIG. 14 is a block diagram of another example implementation of the processor circuitry 1212 of FIG. 12. In this example, the processor circuitry 1212 is implemented by FPGA circuitry 1400. The FPGA circuitry 1400 can be used, for example, to perform operations that could otherwise be performed by the example microprocessor 1300 of FIG. 13 executing corresponding machine-readable instructions. However, once configured, the FPGA circuitry 1400 instantiates the machine-readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine-readable instructions and/or operations represented by the flowchart of FIG. 8 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine-readable instructions and/or operations represented by the flowchart of FIG. 8. In particular, the FPGA circuitry 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowchart of FIG. 8. As such, the FPGA circuitry 1400 may be structured to effectively instantiate some or all of the machine-readable instructions and/or operations of the flowchart of FIG. 8 as dedicated logic circuits to perform the operations corresponding to those software instructions in a dedicated manner analogous to an ASIC. Therefore, the FPGA circuitry 1400 may perform the operations corresponding to the some or all of the machine-readable instructions and/or operations of FIG. 8 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware (e.g., external hardware circuitry) 1406. For example, the configuration circuitry 1404 may implement interface circuitry that may obtain machine-readable instructions to configure the FPGA circuitry 1400, or portion(s) thereof. In some such examples, the configuration circuitry 1404 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may implement the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and interconnections 1410 are configurable to instantiate one or more operations that may correspond to at least some of the machine-readable instructions and/or operations of FIG. 8 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modern FPGA circuitry may include an on-board CPU, such as one or more of the example CPU 1420 of FIG. 14. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine-readable instructions and/or operations represented by the flowchart of FIG. 8 may be executed by one or more of the cores 1302 of FIG. 13 and a second portion of the machine-readable instructions and/or operations represented by the flowchart of FIG. 8 may be executed by the FPGA circuitry 1400 of FIG. 14.

In some examples, the processor circuitry 1212 of FIG. 12 may be in one or more packages. For example, the microprocessor 1300 of FIG. 13 and/or the FPGA circuitry 1400 of FIG. 14 may be in one or more packages. In some examples, an XPU may be implemented by the processor circuitry 1212 of FIG. 12, which may be in one or more packages. For example, the XPU may include a CPU in one package, a DSP in another package, a GPU in yet another package, and an FPGA in still yet another package.

Figure 15:
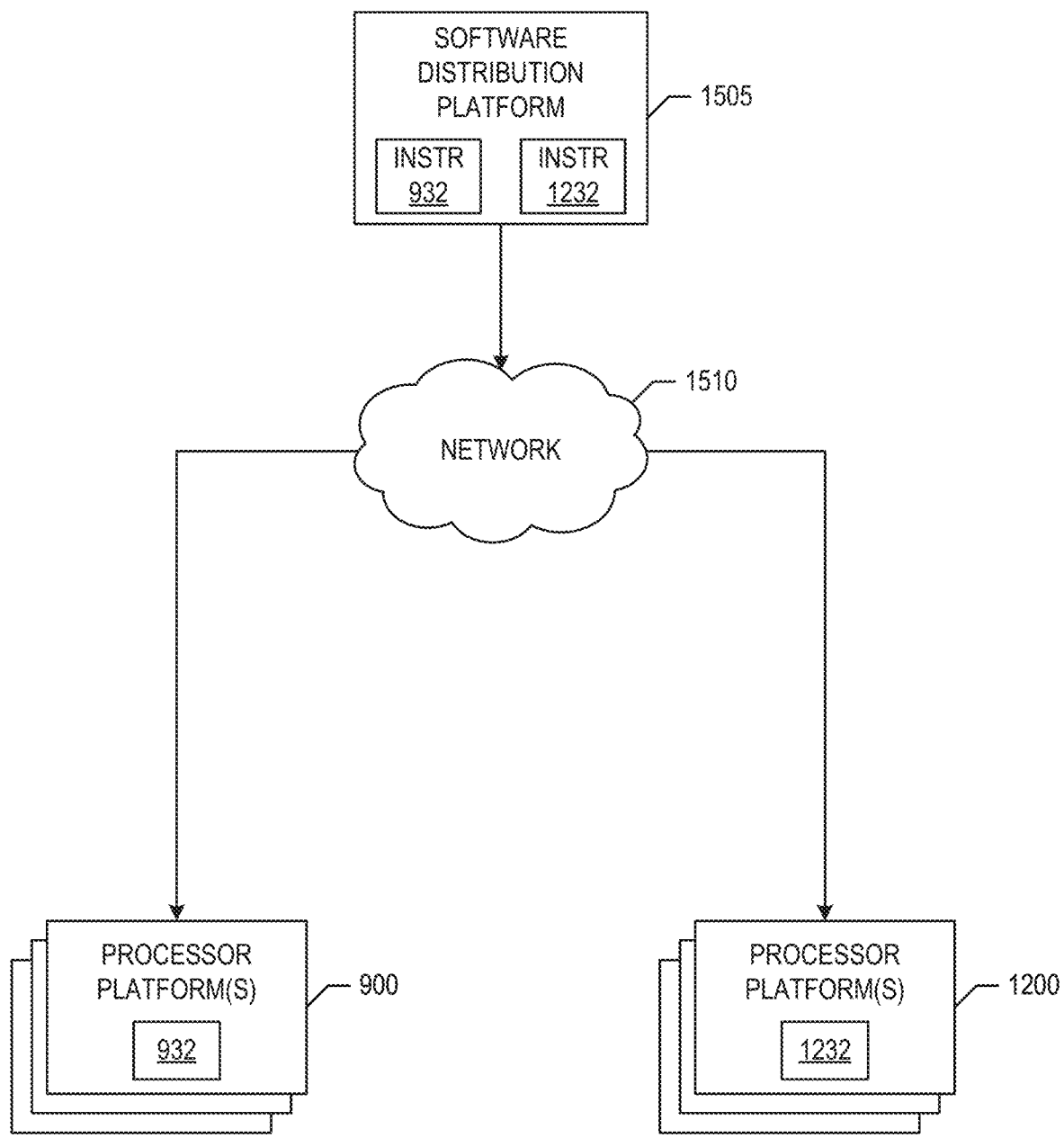
FIG. 15 is a block diagram of an example software distribution platform (e.g., one or more servers) to distribute software (e.g., software corresponding to the example machine-readable instructions of FIGS. 7 and/or 8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine-readable instructions 932 of FIG. 9 and/or the example machine-readable instruction 1232 of FIG. 12 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine-readable instructions 932 of FIG. 9 and/or the example machine-readable instructions 1232 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine-readable instructions 932 and/or the machine-readable instructions 1232, which may correspond to the example machine-readable instructions and/or operations 700 of FIG. 7 and/or the example machine-readable instructions and/or operations 800 of FIG. 8, respectively, as described above. The one or more servers of the example software distribution platform 1505 are in communication with a network 1510, which may correspond to any one or more of the Internet and/or the example network 122 described above. In some examples, the one or more servers are responsive to requests to transmit the software to a requesting party as part of a commercial transaction. Payment for the delivery, sale, and/or license of the software may be handled by the one or more servers of the software distribution platform 1505 and/or by a third-party payment entity. The servers enable purchasers and/or licensors to download the machine-readable instructions 932 and/or the machine-readable instructions 1232 from the software distribution platform 1505. For example, the software, which may correspond to the example machine-readable instructions and/or operations 700 of FIG. 7, may be downloaded to the example processor platform 900, which is to execute and/or instantiate the machine-readable instructions 932 to implement the central facility 118. Additionally or alternatively, the software, which may correspond to the example machine-readable instructions and/or operations 800 of FIG. 8, may be downloaded to the example processor platform 1200, which is to execute and/or instantiate the machine-readable instructions 1232 to implement the locator circuitry 132. In some example, one or more servers of the software distribution platform 1505 periodically offer, transmit, and/or force updates to the software (e.g., the example machine-readable instructions 932 of FIG. 9 and/or the example machine-readable instructions 1232 of FIG. 12) to ensure improvements, patches, updates, etc., are distributed and applied to the software at the end user devices.

From the foregoing, it will be appreciated that example systems, methods, apparatus, and articles of manufacture have been disclosed that locate one or more persons based on adjustable signal strength thresholds. Unlike existing technologies, example systems, methods, apparatus, and articles of manufacture disclosed herein utilize variable thresholds to define variable radii within the same person location system (e.g., in a household, a store, an office, etc.) to establish detection areas of variable radii. Accordingly, example systems, methods, apparatus, and articles of manufacture disclosed herein enable monitoring of irregularly shaped monitoring areas. For example, disclosed systems, methods, apparatus, and articles of manufacture implement different signal strength thresholds corresponding to multiple beacons of the same or substantially similar hardware model (e.g., the same or substantially similar RF beacon hardware model) to establish detection areas of different radii. For example, the example signal strength thresholds corresponding to beacons of the same or substantially similar hardware model correspond to small, medium, and large radii (e.g., small, medium, and large detection areas) to monitor one or more monitoring areas within a monitoring environment (e.g., a TV viewing area).

Disclosed systems, methods, apparatus, and articles of manufacture allow one or more devices to determine the distance of one or more devices in a monitoring environment from RF beacons deployed therein based on at least the strength of Bluetooth signal received by the one or more devices. Additionally, because examples disclosed herein implement RF beacons, examples disclosed herein reduce capital expenditure required to implement example person location system. For example, RF beacons cost much less than other technologies. Disclosed systems, methods, apparatus, and articles of manufacture improve the efficiency of using a computing device by reducing the burden for panelists to set up and use example RF beacons on a daily basis thereby increasing the accuracy and reliability of data gathered by example person location systems. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to locate persons based on adjustable signal strength thresholds are disclosed herein. Further examples and combinations thereof include the following:

Example 1 includes an apparatus comprising at least one non-transitory computer readable medium, and processor circuitry including one or more of at least one of a central processor unit (CPU), a graphics processing unit (GPU), or a digital signal processor (DSP), the at least one of the CPU, the GPU, or the DSP including control circuitry to control data movement within the processor circuitry, arithmetic and logic circuitry to perform one or more first operations corresponding to instructions, and one or more registers to store a first result of the one or more first operation, the instructions in the apparatus, a Field Programmable Gate Array (FPGA), the FPGA including first logic gate circuitry, a plurality of configurable interconnections, and storage circuitry, the first logic gate circuitry and the plurality of configurable interconnections to perform one or more second operations, the storage circuitry to store a second result of the one or more second operations, or Application Specific Integrated Circuitry (ASIC) including second logic gate circuitry to perform one or more third operations, the processor circuitry to perform at least one of the first operations, the second operations, or the third operations to instantiate network interface control circuitry to collect monitoring area information for a monitoring environment, threshold control circuitry to determine, based on the monitoring area information, one or more signal strength thresholds to set for one or more radio frequency (RF) beacons deployed to the monitoring environment, and device location circuitry to, after reception of monitoring information from one or more devices in the monitoring environment, process the monitoring information and the one or more signal strength thresholds to determine one or more locations of the one or more devices in the monitoring environment.

Example 2 includes the apparatus of example 1, wherein the monitoring area information includes at least one of a size of a monitoring area within the monitoring environment, a first number of the one or more RF beacons deployed to the monitoring environment, or a second number of the one or more RF beacons assigned to the monitoring area.

Example 3 includes the apparatus of example 1, wherein the monitoring information includes respective identifiers of the one or more RF beacons that transmitted one or more beacon detection signals received by the one or more devices, respective location determination information, and respective signal strengths of the one or more beacon detection signals.

Example 4 includes the apparatus of example 3, wherein the respective location determination information includes respective known signal strengths a set distance from the one or more RF beacons that transmitted the one or more beacon detection signals.

Example 5 includes the apparatus of example 3, wherein the one or more beacon detection signals include the respective identifiers of the one or more RF beacons and the respective location determination information.

Example 6 includes the apparatus of example 1, wherein the processor circuitry to perform at least one of the first operations, the second operations, or the third operations to instantiate the device location circuitry to store the one or more locations of the one or more devices in a location database.

Example 7 includes the apparatus of example 1, wherein the one or more RF beacons are implemented by a substantially similar RF beacon hardware model.

Example 8 includes a non-transitory computer readable medium comprising instructions which, when executed, cause processor circuitry to at least collect monitoring area information for a monitoring environment, determine, based on the monitoring area information, one or more one or more signal strength thresholds to set for one or more radio frequency (RF) beacons deployed to the monitoring environment, and after reception of monitoring information from one or more devices in the monitoring environment, process the monitoring information and the one or more signal strength thresholds to determine one or more locations of the one or more devices in the monitoring environment.

Example 9 includes the non-transitory computer readable medium of example 8, wherein the monitoring area information includes at least one of a size of a monitoring area within the monitoring environment, a first number of the one or more RF beacons deployed to the monitoring environment, or a second number of the one or more RF beacons assigned to the monitoring area.

Example 10 includes the non-transitory computer readable medium of example 8, wherein the monitoring information includes respective identifiers of the one or more RF beacons that transmitted one or more beacon detection signals received by the one or more devices, respective location determination information, and respective signal strengths of the one or more beacon detection signals.

Example 11 includes the non-transitory computer readable medium of example 10, wherein the respective location determination information includes respective known signal strengths a set distance from the one or more RF beacons that transmitted the one or more beacon detection signals.

Example 12 includes the non-transitory computer readable medium of example 10, wherein the one or more beacon detection signals include the respective identifiers of the one or more RF beacons and the respective location determination information.

Example 13 includes the non-transitory computer readable medium of example 8, wherein the instructions, when executed, cause the processor circuitry to store the one or more locations of the one or more devices in a location database.

Example 14 includes the non-transitory computer readable medium of example 8, wherein the one or more RF beacons are implemented by a substantially similar RF beacon hardware model.

Example 15 includes an apparatus comprising means for controlling one or more communications to collect monitoring area information for a monitoring environment, means for setting one or more thresholds to determine, based on the monitoring area information, one or more one or more signal strength thresholds to set for one or more radio frequency (RF) beacons deployed to the monitoring environment, and means for locating one or more devices to, after reception of monitoring information from one or more devices in the monitoring environment, process the monitoring information and the one or more signal strength thresholds to determine one or more locations of the one or more devices in the monitoring environment.

Example 16 includes the apparatus of example 15, wherein the monitoring area information includes at least one of a size of a monitoring area within the monitoring environment, a first number of the one or more RF beacons deployed to the monitoring environment, or a second number of the one or more RF beacons assigned to the monitoring area.

Example 17 includes the apparatus of example 15, wherein the monitoring information includes respective identifiers of the one or more RF beacons that transmitted one or more beacon detection signal received by the one or more devices, respective location determination information, and respective signal strengths of the one or more beacon detection signals.

Example 18 includes the apparatus of example 17, wherein the respective location determination information includes respective known signal strengths a set distance from the one or more RF beacons that transmitted the one or more beacon detection signals.

Example 19 includes the apparatus of example 17, wherein the one or more beacon detection signals include the respective identifiers of the one or more RF beacons and the respective location determination information.

Example 20 includes the apparatus of example 15, wherein the means for locating one or more devices are to store the one or more locations of the one or more devices in a location database.

Example 21 includes the apparatus of example 15, wherein the one or more RF beacons are implemented by a substantially similar RF beacon hardware model.

Example 22 includes a method comprising collecting monitoring area information for a monitoring environment, determining, based on the monitoring area information, one or more one or more signal strength thresholds to set for one or more radio frequency (RF) beacons deployed to the monitoring environment, and processing, after reception of monitoring information from one or more devices in the monitoring environment, the monitoring information and the one or more signal strength thresholds to determine one or more locations of the one or more devices in the monitoring environment.

Example 23 includes the method of example 22, wherein the monitoring area information includes at least one of a size of a monitoring area within the monitoring environment, a first number of the one or more RF beacons deployed to the monitoring environment, or a second number of the one or more RF beacons assigned to the monitoring area.

Example 24 includes the method of example 22, wherein the monitoring information includes respective identifiers of the one or more RF beacons that transmitted one or more beacon detection signal received by the one or more devices, respective location determination information, and respective signal strengths of the one or more beacon detection signals.

Example 25 includes the method of example 24, wherein the respective location determination information includes respective known signal strengths a set distance from the one or more RF beacons that transmitted the one or more beacon detection signals.

Example 26 includes the method of example 24, wherein the one or more beacon detection signals include the respective identifiers of the one or more RF beacons and the respective location determination information.

Example 27 includes the method of example 22, further including storing the one or more locations of the one or more devices in a location database.

Example 28 includes the method of example 22, wherein the one or more RF beacons are implemented by a substantially similar RF beacon hardware model.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system comprising:
    a processor; and
    a memory having stored therein machine-readable instructions that upon execution by the processor, cause the system to perform operations comprising:
        collecting monitoring area information for a monitoring environment, wherein the monitoring environment comprises a media presentation device configured to present media;
        determining based on the monitoring area information, one or more signal strength thresholds to set for one or more radio frequency (RF) beacons deployed to the monitoring environment;
        after reception of monitoring device information from one or more devices in the monitoring environment, processing the monitoring device information and the one or more signal strength thresholds to determine one or more locations of the one or more devices in the monitoring environment; and
        determining an audience size associated with the media presented by the media presentation device in the monitoring environment based on the one or more locations determined using the monitoring device information and the one or more signal strength thresholds.

2. The system of claim 1, wherein the monitoring area information includes at least one of a size of a monitoring area within the monitoring environment, a first number of the one or more RF beacons deployed to the monitoring environment, or a second number of the one or more RF beacons assigned to the monitoring area.

3. The system of claim 1, wherein the monitoring device information includes respective identifiers of the one or more RF beacons that transmitted one or more beacon detection signals received by the one or more devices, respective location determination information, and respective signal strengths of the one or more beacon detection signals.

4. The system of claim 3, wherein the respective location determination information includes respective known signal strengths a set distance from the one or more RF beacons that transmitted the one or more beacon detection signals.

5. The system of claim 3, wherein the one or more beacon detection signals include the respective identifiers of the one or more RF beacons and the respective location determination information.

6. The system of claim 1, wherein the operations further comprise:
    storing the one or more locations of the one or more devices in a location database.

7. The system of claim 1, wherein the one or more RF beacons are implemented by a substantially similar RF beacon hardware model.

8. A non-transitory computer readable storage medium having stored thereon computer-readable instructions which, when executed by a processor, cause performance of operations comprising:
    collecting monitoring area information for a monitoring environment, wherein the monitoring environment comprises a media presentation device configured to present media;
    determining, based on the monitoring area information, one or more signal strength thresholds to set for one or more radio frequency (RF) beacons deployed to the monitoring environment;
    after reception of monitoring device information from one or more devices in the monitoring environment, processing the monitoring device information and the one or more signal strength thresholds to determine one or more locations of the one or more devices in the monitoring environment; and
    determining an audience size associated with the media presented by the media presentation device in the monitoring environment based on the one or more locations determined using the monitoring device information and the one or more signal strength thresholds.

9. The non-transitory computer storage readable medium of claim 8, wherein the monitoring area information includes at least one of a size of a monitoring area within the monitoring environment, a first number of the one or more RF beacons deployed to the monitoring environment, or a second number of the one or more RF beacons assigned to the monitoring area.

10. The non-transitory computer readable storage medium of claim 8, wherein the monitoring device information includes respective identifiers of the one or more RF beacons that transmitted one or more beacon detection signals received by the one or more devices, respective location determination information, and respective signal strengths of the one or more beacon detection signals.

11. The non-transitory computer readable storage medium of claim 10, wherein the respective location determination information includes respective known signal strengths a set distance from the one or more RF beacons that transmitted the one or more beacon detection signals.

12. The non-transitory computer readable storage medium of claim 10, wherein the one or more beacon detection signals include the respective identifiers of the one or more RF beacons and the respective location determination information.

13. The non-transitory computer readable storage medium of claim 8, wherein the operations further comprise:
    storing the one or more locations of the one or more devices in a location database.

14. The non-transitory computer readable storage medium of claim 8, wherein the one or more RF beacons are implemented by a substantially similar RF beacon hardware model.

15. A method comprising:
    controlling one or more communications to collect monitoring area information for a monitoring environment, wherein the monitoring environment comprises a media presentation device configured to present media;
    setting one or more thresholds to determine, based on the monitoring area information, one or more signal strength thresholds to set for one or more radio frequency (RF) beacons deployed to the monitoring environment;

after reception of monitoring device information from one or more devices in the monitoring environment, processing the monitoring device information and the one or more signal strength thresholds to determine one or more locations of the one or more devices in the monitoring environment; and determining an audience size associated with the media presented by the media presentation device in the monitoring environment based on the one or more locations determined using the monitoring device information and the one or more signal strength thresholds.

16. The method of claim 15, wherein the monitoring area information includes at least one of a size of a monitoring area within the monitoring environment, a first number of the one or more RF beacons deployed to the monitoring environment, or a second number of the one or more RF beacons assigned to the monitoring area.

17. The method of claim 15, wherein the monitoring device information includes respective identifiers of the one or more RF beacons that transmitted one or more beacon detection signal received by the one or more devices, respective location determination information, and respective signal strengths of the one or more beacon detection signals.

18. The method of claim 17, wherein the respective location determination information includes respective known signal strengths a set distance from the one or more RF beacons that transmitted the one or more beacon detection signals.

19. The method of claim 17, wherein the one or more beacon detection signals include the respective identifiers of the one or more RF beacons and the respective location determination information.

20. The method of claim 15, further comprising:

storing the one or more locations of the one or more devices in a location database.

* * * * *